United States Patent
Arima et al.

(10) Patent No.: US 12,266,802 B2
(45) Date of Patent: Apr. 1, 2025

(54) CARBONACEOUS MATERIAL, METHOD FOR PRODUCING SAME, AND ELECTROCHEMICAL DEVICE

(71) Applicant: KURARAY CO., LTD., Kurashiki (JP)

(72) Inventors: Junichi Arima, Bizen (JP); Akinori Yamabata, Bizen (JP); Taketoshi Okuno, Bizen (JP); Shinya Tago, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/918,356

(22) PCT Filed: Apr. 19, 2021

(86) PCT No.: PCT/JP2021/015869
§ 371 (c)(1),
(2) Date: Oct. 12, 2022

(87) PCT Pub. No.: WO2021/215397
PCT Pub. Date: Oct. 28, 2021

(65) Prior Publication Data
US 2023/0197968 A1    Jun. 22, 2023

(30) Foreign Application Priority Data

Apr. 20, 2020 (JP) ................................ 2020-074737
Dec. 25, 2020 (JP) ................................ 2020-217413

(51) Int. Cl.
*H01M 4/62* (2006.01)
*C01B 32/318* (2017.01)
*C01B 32/342* (2017.01)

(52) U.S. Cl.
CPC ........... *H01M 4/625* (2013.01); *C01B 32/318* (2017.08); *C01B 32/342* (2017.08); *C01P 2002/77* (2013.01); *C01P 2004/61* (2013.01); *C01P 2006/12* (2013.01); *C01P 2006/14* (2013.01); *C01P 2006/40* (2013.01)

(58) Field of Classification Search
CPC ............... C01B 32/00–384; C01P 2006/14
See application file for complete search history.

(56) References Cited

U.S. PATENT DOCUMENTS

| | | | |
|---|---|---|---|
| 2015/0263347 A1 | 9/2015 | Imaji | |
| 2015/0270072 A1 | 9/2015 | Sonobe | |
| 2016/0268590 A1 | 9/2016 | Koshima | |
| 2017/0125811 A1* | 5/2017 | Imaji | H01M 10/0525 |
| 2018/0309126 A1* | 10/2018 | Kawakami | H01M 4/133 |
| 2021/0276875 A1* | 9/2021 | Mason | C01B 32/00 |

FOREIGN PATENT DOCUMENTS

| | | | | |
|---|---|---|---|---|
| EP | 3503271 A1 | 6/2019 | | |
| JP | 2009084099 A | 4/2009 | | |
| JP | 2015179666 A | 10/2015 | | |
| JP | 2016152224 A | 8/2016 | | |
| JP | 2016152225 A | 8/2016 | | |
| JP | 2016152226 A | 8/2016 | | |
| JP | 6237781 B2 | 11/2017 | | |
| JP | 2019036505 A | * | 3/2019 | |
| WO | WO-2014034857 A1 | 3/2014 | | |
| WO | WO-2014034859 A1 | 3/2014 | | |
| WO | WO-2016140368 A1 | 9/2016 | | |
| WO | WO-2018034155 A1 | * | 2/2018 | ........... C01B 32/05 |

OTHER PUBLICATIONS

Machine translation of WO 2018/034155 (Year: 2023).*
Machine translation JP-2019036505-A (Year: 2024).*
International Preliminary Report on Patentability and Written Opinion issued Oct. 25, 2022 in PCT/JP2021/015869, 7 pages.
International Search Report issued Jul. 6, 2021 in PCT/JP2021/015869, 3 pages.
Unified Approach to Pore Size Characterization of Microporous Carbonaceous Materials from N2, Ar, and CO2 Adsorption Isotherms, Peter I. Ravikovitch, et al., Langmuir, 2000, vol. 16, No. 5, pp. 2311-2320.
Adsorption of Gases, Katsumi Kaneko, Journal of the Japan Society of Color Material, 1994, vol. 67, No. 2, pp. 115-123 (a statement of relevance is attached).
Extended European Search Report issued May 8, 2024 in corresponding European Patent Application No. 21792410.9, 8 pages.

* cited by examiner

Primary Examiner — Alexandre F Ferre
(74) Attorney, Agent, or Firm — Element IP, PLC

(57) ABSTRACT

The present invention relates to a carbonaceous material having a pore volume determined by performing Grand Canonical Monte Carlo simulation on an adsorption-desorption isotherm of carbon dioxide of 0.05 cm$^3$/g or more and 0.20 cm$^3$/g or less, and a ratio of desorption amount to adsorption amount (desorption amount/adsorption amount) at a relative pressure of 0.01 in the adsorption-desorption isotherm of 1.05 or more.

17 Claims, No Drawings

CARBONACEOUS MATERIAL, METHOD FOR PRODUCING SAME, AND ELECTROCHEMICAL DEVICE

TECHNICAL FIELD

The present application claims the priorities of Japanese Patent Application No. 2020-074737 (filing date: Apr. 20, 2020) and Japanese Patent Application No. 2020-217413 (filing date: Dec. 25, 2020) under the Paris Convention, the entire contents of which are incorporated herein by reference.

The present invention relates to a carbonaceous material, a method of producing the same, and an electrochemical device.

BACKGROUND ART

A carbonaceous material is used in an electrochemical device such as a non-aqueous electrolyte battery, like a lithium ion secondary battery or sodium ion battery, or a lithium ion capacitor and the like, and the carbonaceous material having characteristics in accordance with its application is required. For example, in the use of small portable devices such as a mobile phone and notebook computer, discharge capacity is required to be increased since battery capacity per volume is important. Further, it is difficult to exchange a lithium ion battery for automobiles during the use since the battery is large and expensive. Therefore, at least the same durability of the battery as that of automobiles is required. In addition, high cycle durability which is less likely to lower the discharge capacity even if charge and discharge are repeated is required.

For such requirements, for example, Patent Document 1 describes a carbonaceous material for a non-aqueous electrolyte secondary battery having good discharge capacity and good resistance to oxidative deterioration. Patent Document 2 describes a carbonaceous material that realizes suppressed hygroscopicity and good battery characteristics.

PRIOR ART DOCUMENTS

Patent Documents

[Patent Document 1] JP 2016-152226 A
[Patent Document 2] JP 6237781 B

SUMMARY OF THE INVENTION

Problems to be Solved by the Invention

However, the carbonaceous material described in Patent Document 1 is fired at a relatively high temperature, and the discharge capacity of the non-aqueous electrolyte secondary battery comprising the carbonaceous material is not necessarily sufficiently high. Further, when the heat treatment temperature is lowered for the purpose of increasing the discharge capacity thereof, the durability thereof tends to be inferior. In addition, the carbonaceous material described in Patent Document 2 has a skin portion comprising a carbonaceous material derived from a volatile component from an organic material. Thus, it is considered that the pores are covered, and the suppression of moisture absorption and the relatively high discharge capacity are achieved. However, there has been a demand for a carbonaceous material having higher discharge capacity and high durability while maintaining the discharge capacity.

Therefore, an object of the present invention is to provide a carbonaceous material having excellent discharge capacity and cycle durability and high initial efficiency, and a method of producing the same.

Means for Solving the Problems

As a result of repeated studies in order to solve the above problems, the present inventors have found that even if the heat treatment temperature is lowered, a carbonaceous material having high durability while maintaining the discharge capacity can be obtained by having a pore such that a discrepancy (hysteresis) between the adsorption curve and the desorption curve occurs in the carbon dioxide adsorption-desorption isotherm, and the present invention has been completed.

That is, the present invention encompasses the following preferred embodiments.

[1] A carbonaceous material, which has a pore volume determined by performing Grand Canonical Monte Carlo simulation on an adsorption-desorption isotherm of carbon dioxide of 0.05 cm$^3$/g or more and 0.20 cm$^3$/g or less, and a ratio of desorption amount to adsorption amount (desorption amount/adsorption amount) at a relative pressure of 0.01 in the adsorption-desorption isotherm of 1.05 or more.
[2] The carbonaceous material according to [1], having an oxygen element content of 0.5% by mass or more.
[3] The carbonaceous material according to [1] or [2], having a BET specific surface area in accordance with a nitrogen adsorption method of 1 m$^2$/g or more and 20 m$^2$/g or less.
[4] The carbonaceous material according to [1], having a mesopore volume in accordance with a BJH method of 3.7 mm$^3$/g or more and 41 mm$^3$/g or less.
[5] The carbonaceous material according to [4], having an average particle size ($D_{50}$) of 1.3 μm or more and 9.5 μm or less.
[6] The carbonaceous material according to [4] or [5], having a BET specific surface area in accordance with a nitrogen adsorption method of 3 m$^2$/g or more and 60 m$^2$/g or less.
[7] The carbonaceous material according to any one of [1] to [6], having an average interplanar spacing $d_{002}$ of the (002) plane calculated in accordance with a Bragg equation by means of a wide-angle X-ray diffraction method of 0.36 nm or more and 0.42 nm or less.
[8] The carbonaceous material according to any one of [1] to [7], for an electrochemical device.
[9] The carbonaceous material according to [8], which is used with a pre-doping of a metal ion.
[10] An electrochemical device, comprising the carbonaceous material according to any one of [1] to [9].
[11] A method of producing the carbonaceous material according to any one of [1] to [9], comprising a step of heating a carbon precursor having a BET specific surface area in accordance with a nitrogen adsorption method of 500 m$^2$/g or less to 900° C., wherein a heating rate during a period of from 600° C. or higher to 900° C. or lower in the step is 60° C./minute or less.
[12] The method according to [11], wherein the heating step is performed in the presence of a volatile organic substance.
[13] A method of producing the carbonaceous material according to any one of [1] to [9], comprising a step of performing a heat treatment of a carbon precursor having a BET specific surface area in accordance with a nitrogen adsorption method of 500 m²/g or less at a temperature of 600° C. or higher and lower than 900° C. for more than 5 minutes in the presence of a volatile substance derived from a volatile organic substance.

[14] The method according to any one of [11] to [13], further comprising a step of performing a heat treatment at 900° C. or higher and 1180° C. or lower after the heating step or the heat treatment step.

[15] The method according to any one of [11] to [14], further comprising a step of pulverizing the carbon precursor and/or the heat treated carbon precursor.

Effects of the Invention

According to the present invention, it is possible to provide a carbonaceous material having excellent discharge capacity and cycle durability and high initial efficiency, and a method of producing the same.

Further, in one embodiment of the present invention, it is also possible to provide a carbonaceous material which can be pre-doped at high speed and simultaneously satisfies high capacity, high initial efficiency and high cycle durability.

Mode for Carrying Out the Invention

Hereinafter, embodiments of the present invention are described in detail. It should be noted that the following is an example of an embodiment of the present invention, and it is not intended to limit the present invention to the following embodiments.

<Carbonaceous Material>

The carbonaceous material of the present invention has a pore volume determined by performing Grand Canonical Monte Carlo simulation on an adsorption-desorption isotherm of carbon dioxide of 0.05 cm³/g or more and 0.20 cm³/g or less, and a ratio of desorption amount to adsorption amount (desorption amount/adsorption amount) at a relative pressure of 0.01 in the isotherm of 1.05 or more.

(Pore Volume)

In the present invention, a pore volume determined by performing Grand Canonical Monte Carlo simulation on an adsorption-desorption isotherm of carbon dioxide (hereinafter, also simply referred to as "pore volume") is 0.05 cm³/g or more and 0.20 cm³/g or less. In the present invention, when the pore volume is less than 0.05 cm³/g, it is considered that the pores are excessively closed by heat shrinkage, and there is a possibility that the discharge capacity of an electrochemical device comprising the carbonaceous material of the present invention decreases. When the pore volume is more than 0.20 cm³/g, there is a possibility that the cycle durability of an electrochemical device comprising the carbonaceous material of the present invention decreases since the number of active sites that are the starting points of a side reaction increases. The pore volume is preferably 0.07 cm³/g or more, more preferably 0.10 cm³/g or more, still more preferably 0.13 cm³/g or more, and preferably 0.19 cm³/g or less, more preferably 0.18 cm³/g or less, still more preferably 0.17 cm³/g or less. When the pore volume is equal to or higher than the lower limit value and equal to or lower than the upper limit value, the initial discharge capacity and cycle durability of an electrochemical device comprising the carbonaceous material of the present invention tend to be high. The pore volume of the carbonaceous material of the present invention can be adjusted to be equal to or higher than the lower limit value and equal to or lower than the upper limit value by appropriately adjusting the type of a carbon precursor, the temperature or time of the heating step and/or heat treatment step, or the type or amount of a volatile organic substance and/or volatile substance in the method of producing the carbonaceous material of the present invention described later. By performing Grand Canonical Monte Carlo simulation on the adsorption-desorption isotherm of carbon dioxide, for example, the pore volume at a pore diameter of 0.35 to 1.47 nm can be obtained. The pore volume can be determined by the method described in Examples described later.

The pore volume determined by performing Grand Canonical Monte Carlo simulation on the adsorption-desorption isotherm of carbon dioxide in the present invention is described below. The pore volume of mesopores (pores having a diameter of about 2 nm or more and about 50 nm or less) or micropores (pores having a pore diameter of less than about 2 nm) can be determined by applying an analysis method called a BJH method or MP method to the adsorption-desorption isotherm of nitrogen usually at 77K. However, in the present invention, the adsorption-desorption isotherm of carbon dioxide at 273K is used. Since carbon dioxide which has a smaller molecular size than nitrogen is used in this method and the molecules do not form clusters due to the measurement at a higher temperature, more detailed evaluation of the pore structure can be performed. This makes it possible to more accurately evaluate the pores that are the starting points of a side reaction that affects cycle durability, which might be difficult to evaluate with ordinary measurement methods, and it is found that a discrepancy (hysteresis) between the adsorption curve and desorption curve, which is thought to be derived from the ink bottle type pores described later, can be measured more accurately.

(Ratio of Desorption Amount to Adsorption Amount of Carbon Dioxide)

In the present invention, a ratio of desorption amount to adsorption amount (desorption amount/adsorption amount) at a relative pressure of 0.01 in the adsorption-desorption isotherm of carbon dioxide is 1.05 or more. If the value of desorption amount/adsorption amount is less than 1.05, a side reaction is likely to occur and a decrease of the cycle durability is likely to be led. The value of desorption amount/adsorption amount is preferably 1.06 or more, more preferably 1.08 or more, still more preferably 1.10 or more, even more preferably 1.20 or more, particularly preferably 1.30 or more, extremely preferably 1.40 or more, more extremely preferably 2.31 or more and especially extremely preferably 2.37 or more. When the value of desorption amount/adsorption amount is equal to or higher than the lower limit value, the cycle durability of an electrochemical device comprising the carbonaceous material of the present invention tends to be improved. When the value of desorption amount/adsorption amount is large, the cycle durability is further improved by reducing the active sites that are the starting points of a side reaction due to the increase in the number of the ink bottle type pores described later. Thus, the upper limit value is not particularly limited, but usually 10.0 or less. The desorption amount/adsorption amount of the present invention can be adjusted to be equal to or higher than the lower limit value by appropriately adjusting the temperature or time of the heating step and/or heat treatment step, or the type or amount of a volatile organic substance and/or volatile substance, in the method of producing a carbonaceous material of the present invention described later. The desorbed and adsorbed amount of carbon dioxide can be determined by the method described in Examples described later.

The ratio of desorption amount to adsorption amount (desorption amount/adsorption amount) at a relative pressure of 0.01 in the adsorption-desorption isotherm of carbon dioxide is described below. When a cylindrical pore with one end closed is assumed, the adsorption curve and desorption curve should theoretically match. However, depending on the pore structure, a discrepancy (hysteresis) between the adsorption curve and desorption curve may occur. There are various theories as to the cause of this phenomenon, but for example, in "Journal of the Japan Society of Color Material" (1994, vol. 67, No. 2, p. 115-123), a theory that the hysteresis occurs in the case of the ink bottle type pore is proposed. According to this theory, the ink bottle type pore has a neck portion (the radius of the neck portion is shorter than the radius of the bottom portion), so that it has a different saturated vapor pressure. When the relative pressure is changed in the direction of decreasing, the adsorption layer on the neck portion does not evaporate until the saturated vapor pressure corresponding to the radius of the neck portion is reached. That is, even if it tries to evaporate from the adsorption layer at the bottom portion, it is held down by the condensed layer at the inlet and is difficult to be desorbed. In this way, it is considered that the deviation between the adsorption amount and desorption amount is likely to occur, and the desorption amount is likely to be larger than the adsorption amount. Thus, based on this theory, the fact that the ratio of the desorption amount to adsorption amount (desorption amount/adsorption amount) at a relative pressure of 0.01 in the adsorption-desorption isotherm is within the above range indicates the possibility of the existence of the ink bottle type pores.

(Oxygen Element Content)

In one preferred embodiment of the present invention (hereinafter may be referred to as "aspect I"), an oxygen element content of the carbonaceous material is preferably 0.5% by mass or more, more preferably 0.6% by mass or more, still more preferably 1.0% by mass or more, even more preferably 1.1% by mass or more. The upper limit value of the oxygen element content is not particularly limited, but is usually 5.0% by mass or less, preferably 2.0% by mass or less, and more preferably 1.5% by mass or less. When the oxygen element content is equal to or higher than the lower limit value, it is easy to obtain a carbonaceous material having excellent solvent affinity. The oxygen element content can be adjusted to be equal to or higher than the lower limit value by adjusting the type of a carbon precursor, or the temperature or time of the heating step and/or heat treatment step in the method of producing a carbonaceous material of the present invention described later. The oxygen element content can be determined by, for example, an elemental analysis method, a fluorescent X-ray analysis method or the like.

(BET Specific Surface Area in Accordance with Nitrogen Adsorption Method in Aspect I)

In aspect I of the present invention, a BET specific surface area of the carbonaceous material in accordance with a nitrogen adsorption method (hereinafter, also simply referred to as "specific surface area") is preferably 1 m²/g or more, more preferably 2 m²/g or more, still more preferably 3 m²/g or more, even more preferably 4 m²/g or more, particularly preferably 5 m²/g or more, and preferably 20 m²/g or less, more preferably 15 m²/g or less, still more preferably 10 m/g or less. When the specific surface area is equal to or more than the lower limit value and less than or equal to the upper limit value, the number of active points that are the starting points of a side reaction is reduced, so that the input/output characteristics of an electrochemical device comprising the carbonaceous material of the present invention are improved, and the irreversible capacity tends to be decreased. The specific surface area can be adjusted to be equal to or higher than the lower limit value and equal to or lower than the upper limit value by appropriately adjusting the temperature or time of the heating step and/or heat treatment step, or the type or amount of the volatile organic substance and/or volatile substance in the method of producing the carbonaceous material of the present invention described later. The specific surface area of the carbonaceous material of the present invention can be determined in accordance with the method described in Examples described later.

(Average Particle Size ($D_{50}$) in Aspect I)

An average particle size ($D_{50}$) of the carbonaceous material in aspect I can be adjusted to be, for example, in the range of 1 to 200 µm. When the average particle size is within the above range, fine powder is less likely to be generated, an increase in specific surface area is suppressed, and a side reaction of the obtained carbonaceous material is less likely to occur. Further, when an electrode is produced from the obtained carbonaceous material, it is easy to reduce the coating thickness of the active material on the current collector plate, so that the electrode area can be increased in order to improve the input/output characteristics. In aspect I, the average particle size of the carbonaceous material of the present invention is preferably 1 µm or more, more preferably 2 µm or more, still more preferably 3 µm or more, particularly preferably 4 µm or more, and preferably 200 µm or less, more preferably 150 µm or less, still more preferably 100 µm or less, particularly preferably 50 µm or less.

(Mesopore Volume)

In another preferred embodiment of the present invention (hereinafter may be referred to as "aspect II"), a mesopore volume of the carbonaceous material in accordance with a BJH method is preferably 3.7 mm³/g or more and 41 mm³/g or less. When the mesopore volume is 3.7 mm³/g or more and 41 mm³/g or less, it is possible to pre-dope at high speed since the diffusion rate of ions from an electrolytic solution to the carbonaceous material is appropriate. Further, a carbonaceous material easily satisfies high initial efficiency and high cycle durability since the active sites thereof that are the starting points of side reactions are unlikely to increase. The mesopore volume is preferably 4.0 mm³/g or more, more preferably 8.0 mm³/g or more, further preferably 10.5 mm³/g or more, still more preferably 10.9 mm³/g or more, and preferably 35 mm³/g or less, more preferably 22 mm³/g or less, still more preferably 14.4 mm³/g or less. When the mesopore volume is within the above range, it is possible to pre-dope at high speed, and high capacity, high initial efficiency, and high cycle durability are more likely to be satisfied at the same time, and particularly pre-doping at high-speed is likely to be achieved. The "mesopore volume" generally refers to the volume of pores having a pore diameter of about 2 nm or more and about 50 nm or less. However, in the present invention, particularly it may refer to pores having a pore diameter of 2.5 nm or more and 33 nm or less, from the viewpoint of evaluations of active points which are the starting points of a side reaction and the diffusivity of an electrolytic solution. The mesopore volume can be adjusted within the above range by appropriately adjusting, for example, the type and particle size of the carbon precursor; the temperature and/or time of the heat treatment step; the type and/or amount of volatile organic substance, and the like in the method of producing the carbonaceous material of the present invention described later. The mesopore volume can be measured using a gas adsorption device, and can be determined, for example, by the method described in Examples.

(Average Particle Size ($D_{50}$) in Aspect II)

The average particle size ($D_{50}$) of the carbonaceous material in aspect II of the present invention is preferably 1.3 µm or more, more preferably 2.2 µm or more, still more preferably 2.6 µm or more, and preferably 9.5 µm or less, more preferably 8.0 µm or less, further preferably 5.5 µm or less, still more preferably 4.9 µm or less, particularly preferably 4.7 µm or less. When the average particle size ($D_{50}$) of the carbonaceous material in aspect II is equal to or more than the lower limit, the cycle durability and initial efficiency are likely to be improved since the active sites that are the starting points of a side reaction are unlikely to occur. When the average particle size ($D_{50}$) is equal to or less than the upper limit, pre-doping at high speed tends to be possible since the electrode density is likely to be increased and the ion diffusion rate is likely to be improved. In addition, the mesopore volume can be easily adjusted within the above range. The average particle size ($D_{50}$) in the present invention refers to a volume average particle size in which the cumulative volume from the fine particle side is 50% in the particle size distribution measured in accordance with the laser scattering method. The average particle size ($D_{50}$) can be adjusted within the above range by appropriately adjusting, for example, the particle size of a carbon precursor; the conditions of the pulverization step; the temperature and/or time of the heat treatment step; the mixing ratio of the carbonaceous material having different particle sizes and the like in the method of producing the carbonaceous material of the present invention described later. In particular, in order to obtain a carbonaceous material having a desired average particle size, the average particle size may be adjusted within the above range by mixing two or more kinds of carbonaceous materials having different average particle sizes.

(BET Specific Surface Area in Accordance with Nitrogen Adsorption Method in Aspect II)

In aspect II of the present invention, the specific surface area of the carbonaceous material is preferably 3 $m^2/g$ or more, more preferably 9 $m^2/g$ or more, further preferably 13 $m^2/g$ or more, still more preferably 16 $m^2/g$ or more, particularly preferably 22 $m^2/g$ or more, and preferably 60 $m^2/g$ or less, more preferably 40 $m^2/g$ or less, and further preferably 35 $m^2/g$ or less. In aspect II, when the specific surface area is within the above range, pre-doping at high speed is likely to be possible since the number of the active sites that are the starting points of a side reaction tends to decrease, and appropriate reaction area with an electrolytic solution can be secured. Moreover, the high capacity, high initial efficiency and high cycle durability are easily satisfied at the same time. The specific surface area can be adjusted within the above range by appropriately adjusting, for example, the type and/or particle size of a carbon precursor; the temperature and/or time of the heat treatment step; the conditions of the pulverization step; the type and/or amount of the volatile organic substance and the like in the method of producing the carbonaceous material of the present invention described later. The specific surface area of the carbonaceous material of the present invention can be measured using a gas adsorption device, and can be determined, for example, by the method described in Examples.

(Average Interplanar Spacing $d_{002}$ of the (002) Plane)

The average interplanar spacing $d_{002}$ of the (002) plane of the carbonaceous material of the present invention, which is calculated using the Bragg equation in accordance with a wide-angle X-ray diffraction method, is preferably 0.36 nm or more, more preferably 0.38 nm or more, and preferably 0.42 nm or less, more preferably 0.40 nm or less. When the average interplanar spacing $d_{002}$ of the (002) plane is equal to or higher than the lower limit value and equal to or lower than the upper limit value, the capacity retention rate at a low temperature of an electrochemical device comprising the carbonaceous material of the present invention tends to be excellent. In addition, the carbonaceous material is suitable for various electrochemical devices since ions easily enter. The average interplanar spacing $d_{002}$ of the (002) plane of the carbonaceous material of the present invention can be adjusted to be equal to or higher than the lower limit value and equal to or lower than the upper limit value by appropriately adjusting, for example, the temperature of the heating step and/or heat treatment step in the production method described later. The average interplanar spacing $d_{002}$ of the (002) plane of the carbonaceous material of the present invention can be measured by, for example, an X-ray diffraction.

<Method of Producing Carbonaceous Material>

The carbonaceous material of the present invention can be produced, for example, by a method comprising a step of heating of a carbon precursor having a BET specific surface area of 500 $m^2/g$ or less in accordance with a nitrogen adsorption method to 900° C., and a heating rate during a period of from 600° C. or higher to 900° C. or lower in the step is 60° C./minute or less.

In the above-mentioned production method, the heating step is preferably performed in the presence of a volatile organic substance.

Alternatively, the carbonaceous material of the present invention can also be produced by the method comprising a step of performing a heat treatment of a carbon precursor having a BET specific surface area in accordance with a nitrogen adsorption method of 500 $m^2/g$ or less at a temperature of 600° C. or higher and lower than 900° C. for more than 5 minutes in the presence of a volatile substance derived from a volatile organic substance.

In the present invention, it is presumed that the following reactions occur by heating the volatile organic substance and the carbon precursor and/or by performing the heat treatment of the carbon precursor in the presence of the volatile substance derived from the volatile organic substance. It is considered that the volatile component can form a skin portion on the surface of the calcined product (heat-treated product) of the carbon precursor being a core in the heating step and/or the heat treatment step. At this time, by appropriately adjusting the heating rate in the heating step and/or the heat treatment step, it is conceivable that the skin portion is effectively formed, and thereby the pore of the carbon precursor becomes narrowed and the ink bottle type pore having an opening portion can be formed (hereinafter, the formation of the skin portion may be referred to as modification). In the carbonaceous material having such structure, the active point which is a starting point of a side reaction is reduced by the modification with the volatile substance derived from the volatile organic substance even at a low heat treatment temperature. Therefore, the carbonaceous material has high cycle durability while maintaining the discharge capacity. However, even if the actual aspect is different from the above estimation, it is comprised in the scope of the present invention.

(Carbon Precursor)

In the present invention, a carbon precursor is not particularly limited as long as it forms the carbonaceous material, and it can be widely selected from a carbon precursor derived from a plant, carbon precursor derived from a mineral, carbon precursor derived from a natural material, carbon precursor derived from a synthetic material and the like. From the viewpoint of protecting the environment and commerce, the carbonaceous material of the present invention is preferably based on the plant-derived carbon precursor, in other words, the carbon precursor that becomes the carbonaceous material of the present invention is preferably derived from a plant.

Examples of the carbon precursor derived from a mineral include petroleum-based, carbon-based pitch and coke. Examples of the carbon precursor derived from a natural material include natural fibers such as cotton and hemp, regenerated fibers such as rayon and viscose rayon, and semisynthetic fibers such as acetate and triacetate. Examples of the carbon precursor derived from a synthetic material include polyamide-based such as nylon, polyvinyl alcohol-based such as vinylon, polyacrylonitrile-based such as acryl, polyolefin-based such as polyethylene and polypropylene, polyurethane, phenol-based resins, and vinyl chloride-based resins.

There is no particular limitation on the plant that is the material for the carbon precursor derived from a plant (hereinafter, the carbon precursor derived from a plant may be referred to as "a plant-derived char"). The examples thereof include a coconut shell, coffee bean, tea leaf, sugar cane, fruit (for example, an orange and banana), straw, rice husk, broad leaved tree, needle leaved tree and bamboo. These exemplified materials also include waste after use for their intended purpose (for example, used tea leaf) or a part of the plant materials (for example, banana or orange peel). These plants can be used alone or in combination of two or more. Among these plants, the coconut shell is preferable since it is readily available in a large amount.

The term "char" generally refers to a carbon-rich powder-form solid that is obtained when coal is heated, and is not melted and softened. However, the term "char" hereinafter also refers to a carbon-rich powder-form solid that is obtained by heating an organic material, and is not melted and softened.

The coconut shell is not particularly limited, and examples thereof include coconut shells of palm trees (oil palm), coconut palm, salak, and double coconut. These coconut shells may be used alone or in combination. Coconut shells of coconut palm and oil palm, which are biomass wastes generated in large amounts when used as food, detergent raw materials, biodiesel oil raw materials and the like, are particularly preferred.

A method of producing the char from a coconut shell is not particularly limited, and can be produced by using a method known in the art. For example, it can be produced by the heat treatment (hereinafter, may be referred to as "pre-calcining") of the coconut shell under the atmosphere of an inert gas such as nitrogen, carbon dioxide, helium, argon, carbon monoxide or fuel exhaust gas, a mixed gas of these inert gases, or a mixed gas with another gas comprising these inert gases as a main component (for example, a mixed gas of nitrogen and halogen gas) at a temperature of about 300 to 1000° C.

Alternatively, it is possible to obtain in the form of char (for example, a coconut shell char).

The carbonaceous material produced from a plant-derived char can be doped with a large amount of an active material and is, therefore, basically suitable as a carbonaceous material for an electrochemical device such as a non-aqueous electrolytic secondary battery. However, generally a plant-derived char often comprises a large amount of metal elements contained in the plant (especially potassium, iron and the like). If such an electrode comprising the carbonaceous material comprising a large amount of these metal elements is used for an electrochemical device, it may have an undesirable effect on electrochemical properties and safety. Therefore, it is preferable to reduce the content of potassium element, iron element and the like comprised in the carbonaceous material as much as possible.

Further, in addition to potassium and iron elements, the plant-derived char often comprises alkali metals (for example, sodium), alkaline earth metals (for example magnesium or calcium), transition metals (for example, copper) and other elements (in the following, these are also collectively referred to as "ash"). If an electrode comprising a carbonaceous material comprising these metal elements is used for a negative electrode of a non-aqueous electrolyte secondary battery such as a lithium ion secondary battery, impurities are eluted into an electrolytic solution upon the de-doping from the negative electrode and thereby it may adversely affect the battery performance and impair the reliability of the non-aqueous electrolyte secondary battery. Thus, it is preferable to reduce the content of these metals.

Therefore, it is preferable to reduce the content of ash (alkali metal elements, alkaline earth metal elements, transition metal elements, and other elements) in the plant material or plant-derived char prior to heating or heat treatment of the carbon precursor to obtain the carbonaceous material. Hereinafter, reducing the ash content in the plant material or plant-derived char may be referred to as "decalcification". The decalcification method is not particularly limited, and for example, a method of extracting and decalcifying the metal components using an acidic solution comprising a mineral acid such as hydrochloric acid or sulfuric acid or an organic acid such as acetic acid, formic acid and the like (liquid phase decalcification); or a method of decalcifying by exposing to a high-temperature gas phase comprising a halogen compound such as hydrogen chloride (gas phase decalcification) can be employed.

The liquid phase decalcification may be performed in either form of the plant material or plant-derived char. The liquid phase decalcification can be performed, for example, by immersing the plant material or plant-derived char in an acidic solution. The acidic solution is a mixture of an acid and aqueous solution. The acid is not particularly limited, and examples thereof include an aqueous solution of a mineral acid such as hydrochloric acid and sulfuric acid; an organic acid such as acetic acid, butyric acid and citric acid. From the viewpoint of avoiding residual unnecessary ions in the object to be decalcified, it is preferable to use an organic acid as the acid, and from the viewpoint of decalcification efficiency, economic efficiency such as the price of the acid, and the ease of the waste liquid treatment after use, it is more preferable to use acetic acid and/or citric acid. Examples of the aqueous solution include water and a mixture of water and a water-soluble organic solvent. Examples of the water-soluble organic solvent include alcohols such as methanol, ethanol, propylene glycol, ethylene glycol.

The acid concentration in the acidic solution is not particularly limited, but is preferably in the range of 0.001 to 1M, more preferably in the range of 0.002 to 0.9M, and still more preferably in the range of 0.005 to 5M since the decalcification rate is affected by the acid concentration. The amount of the acidic solution used is also not particularly limited, but it is preferable that the plant material or plant-derived char to be immersed is immersed in the acidic solution. Thus, for example, the mass of the acidic solution relative to the mass of the plant material or plant-derived char to be immersed is preferably 100 to 1000% by mass, more preferably 200 to 900% by mass, and still more preferably 250 to 800% by mass.

The temperature of the liquid phase decalcification may be determined according to the plant material or plant-derived char being decalcified, but may be, for example, 10 to 120° C., preferably 20 to 100° C., more preferably 25 to 95° C. When the decalcification temperature is within the above range, the decalcification can be efficiently performed while suppressing a decrease in carbon content due to the hydrolysis of the organic substances constituting the plant.

The time for the liquid phase decalcification is not particularly limited, but may be, for example, 0.1 to 100 hours, preferably 0.2 to 50 hours, and more preferably 0.5 to 20 hours. The liquid phase decalcification may be performed by continuously immersing the plant material or plant-derived char in the acidic solution, or may be performed in a plurality of times while updating the acidic solution used for the decalcification. When the liquid phase decalcification is performed in a plurality of times, the total decalcification time is defined as the liquid phase decalcification time.

A device used for the liquid phase decalcification is not particularly limited as long as it is a device capable of immersing the plant material or plant-derived char in the acidic solution. For example, a glass-lined agitator can be used.

The gas phase decalcification may be performed in either form of the plant material or plant-derived char. The gas phase decalcification can be performed, for example, by the heat treatment of the plant material or plant-derived char in the gas phase containing a halogen compound. The halogen compound is not particularly limited, and for example, fluorine, chlorine, bromine, iodine, hydrogen fluoride, hydrogen chloride, hydrogen bromide, iodine bromide, chlorine fluoride (ClF), iodine chloride (ICl), iodine bromide (IBr), bromine chloride (BrCl) and the like can be mentioned. A compound that generates these halogen compounds by thermal decomposition or mixtures thereof can also be used. The halogen compound is preferably hydrogen chloride from the viewpoint of the supply stability and the stability of the halogen compound used.

The gas phase decalcification may be performed in a gas phase in which the halogen compound and an inert gas are mixed. The inert gas is not particularly limited as long as it does not react with the substance to be decalcified (the plant material or plant-derived char) and the decalcificated plant material or plant-derived char at the decalcification temperature. For example, nitrogen, helium, argon, krypton, or a mixed gas thereof can be mentioned. The inert gas is preferably nitrogen from the viewpoint of the supply stability and economic efficiency.

When the gas phase decalcification is performed in the gas phase in which the halogen compound and inert gas are mixed, the mixing ratio of the halogen compound and inert gas is not particularly limited as long as the sufficient decalcification can be achieved. For example, the amount of the halogen compound with respect to the inert gas is preferably 0.01 to 10.0% by volume, more preferably 0.05 to 8.0% by volume, and still more preferably 0.1 to 5.0% by volume.

The temperature of the gas phase decalcification may be determined according to the plant material or plant-derived char to be decalcified, and the temperature may be, for example, 500 to 1100° C., preferably 600 to 1050° C., more preferably 650 to 1000° C., and still more preferably 850 to 1000° C. If the decalcification temperature is too low, the decalcification efficiency may decrease and the sufficient decalcification may not be performed. If the decalcification temperature is too high, activation by the halogen compound may occur.

The time for the gas phase decalcification is not particularly limited, but is, for example, 5 to 300 minutes, preferably 10 to 200 minutes, and more preferably 15 to 150 minutes.

The supply amount (flow amount) of the gas phase in the gas phase decalcification is not particularly limited. For example, the amount is preferably 1 ml/minute or more, more preferably 5 ml/minute or more, and still more preferably 10 ml/minute or more per 1 g of the plant material or plant-derived char.

A device used for the gas phase decalcification is not particularly limited as long as it can heat the plant material or plant-derived char and the gas phase comprising the halogen compound while mixing them. For example, a fluidized bed can be used, and a continuous or batch type intralayer distribution device by a fluidized bed can be used.

When the gas phase decalcification is performed, a further heat treatment in the absence of the halogen compound may be performed after the heat treatment in the gas phase comprising the halogen compound. Due to the heat treatment in the gas phase comprising the halogen compound, the plant material or plant-derived char usually comprises the halogen. The halogen comprised in the plant material or plant-derived char can be removed by the heat treatment in the absence of halogen compound. For example, after the heat treatment in the gas phase comprising the halogen compound, the halogen can be removed by blocking the supply of the halogen compound and performing the heat treatment. Specifically, the heat treatment in the absence of the halogen compound may be performed in an inert gas atmosphere comprising no halogen compound at 500° C. to 1100° C., preferably 600 to 1050° C., more preferably 650 to 1000° C., and still more preferably 850 to 1000° C. The temperature of the heat treatment in the absence of the halogen compound is preferably the same as or higher than the temperature of the heat treatment in the gas phase comprising the halogen compound. The time of the heat treatment in the absence of the halogen compound is also not particularly limited, but is preferably 5 to 300 minutes, more preferably 10 to 200 minutes, and still more preferably 10 to 100 minutes.

The liquid phase decalcification and gas phase decalcification in the present embodiment are the treatments for removing ash such as potassium, iron and the like comprised in the plant material or plant-derived char. The potassium element content of the carbon precursor obtained after the liquid phase decalcification treatment or gas phase decalcification treatment is preferably 1000 ppm (0.1% by mass) or less, more preferably 500 ppm or less, and still more preferably 300 ppm or less. The iron element content of the carbon precursor obtained after the liquid phase decalcification treatment or gas phase decalcification treatment is preferably 200 ppm or less, more preferably 150 ppm or less, and still more preferably 100 ppm or less. When the potassium element content and iron element content of the carbon precursor is equal to or less than the above upper limit, the elution of impurities into an electrolytic solution during de-doping can be reduced when the obtained carbonaceous material is used for an electrode of an electrochemical device such as a non-aqueous electrolyte secondary battery, which is preferable in terms of improving the performance and reliability of the electrochemical device.

In the production method of the present invention, in order to obtain the carbonaceous material having a desired particle size, a step of pulverizing the carbon precursor and/or heat treated carbon precursor described later may be performed as necessary. When the pulverization step is performed, it is preferable to perform a classification step as well.

In the pulverization step, it is preferable to pulverize the carbon precursor and/or heat treated carbon precursor so that the average particle size after the heating step and/or heat treatment step becomes desired particle size, from the viewpoint of handleability upon producing an electrochemical device.

The carbon precursor shrinks by about 0 to 20% depending on the conditions of the heating step and/or heat treatment step described later. Thus, when the carbon precursor is pulverized before the heating step and/or heat treatment step, it is preferable to adjust the average particle size of the carbon precursor so that their average particle size is about 0 to 20% larger than the average particle size desired as the carbonaceous material.

The order of the pulverization step is not particularly limited since the carbon precursor is not melted in the heating step and/or heat treatment step described later. From the viewpoint of reducing the specific surface area of the carbonaceous material and suppressing the surface oxidation due to the pulverization, it is preferable to perform the pulverization step on the carbon precursor before the heating step and/or heat treatment step. This is because the reduction in the specific surface area may not be sufficiently achieved when the carbon precursor is pulverized after heating with a volatile organic substance and/or heat treatment in the presence of a volatile substance. However, it is not excluded that the pulverization step is performed after these steps.

A pulverizer used in the pulverization step is not particularly limited, and for example, a jet mill, ball mill, hammer mill, rod mill or the like can be used. From the viewpoint of generating less fine powder, a jet mill having a classification function is preferable. When the ball mill, hammer mill, rod mill or the like is used, fine powder can be removed by classifying after the pulverization step.

The pulverization may be either wet pulverization or dry pulverization. The dry pulverization is preferable since post-treatment such as drying after the pulverization is not required.

The classification step makes it possible to more accurately adjust the average particle size of the carbonaceous material. For example, it is possible to exclude particles having a particle size of less than 1 μm.

When the particles having a particle size of less than 1 μm are excluded by the classification, it is preferable that the content of the particles having a particle size of less than 1 μm is 3.0% by volume or less in the carbonaceous material of the present invention. The removal of the particles having a particle size of less than 1 μm is not particularly limited as long as it is performed after the pulverization, but it is preferable to perform the pulverization at the same time as the classification. In the carbonaceous material of the present invention, the content of the particles having a particle size of less than 1 μm is preferably 3.0% by volume or less, preferably 2.5% by volume or less, and still more preferably 2.0% by volume or less from the viewpoint of reducing the specific surface area and irreversible capacity.

The classification method is not particularly limited, but examples thereof include classification using a sieve, wet classification, and dry classification. Examples of the wet classifier include classifiers that utilize principles such as gravity classification, inertial classification, hydraulic classification, and centrifugal classification. Examples of the dry classifier include classifiers that utilize principles such as sedimentation classification, mechanical classification, and centrifugal classification.

The pulverization step and classification step can also be performed using one device. For example, the pulverization step and classification step can be performed by using a jet mill having a dry classification function. Further, a device in which a pulverizer and classifier are independent can be used. In this case, the pulverization and classification can be performed continuously, but can also be performed discontinuously.

In order to obtain the carbonaceous material having the desired average particle size, two or more carbon precursors or heat treated carbon precursors (carbonaceous materials) with specific different average particle sizes that have undergone the pulverization step and optionally classification step can be mixed.

In the present invention, the specific surface area of the carbon precursor (the specific surface area after the pulverization step when the pulverization step is performed to the carbon precursor) is preferably 500 $m^2/g$ or less, more preferably 450 $m^2/g$ or less. When the specific surface area of the carbon precursor is equal to or less than the above upper limit value, the modification by the volatile substance is sufficiently performed in the heating step and/or heat treatment step described later, and thereby the cycle durability of an electrochemical device comprising the carbonaceous material of the present invention tends to be excellent. The lower limit value of the specific surface area of the carbon precursor is not particularly limited, but it is usually 25 $m^2/g$ or more. The specific surface area of the carbon precursor can be adjusted to equal to or less than the upper limit value by appropriately adjusting the temperature or time of the pre-calcining, or the atmosphere in which the pre-calcining is performed. The specific surface area of the carbon precursor can be measured using, for example, the BET method.

(Heating Step)

One aspect of the present invention comprises, for example, a step of heating the carbon precursor having a BET specific surface area of 500 $m^2/g$ or less to 900° C., wherein a rate of heating during a period of from 600° C. or higher to 900° C. or lower in the step is 60° C./minute or less. The heating step is preferably performed in the presence of a volatile organic substance.

By heating the carbon precursor and volatile organic substance from 600 to 900° C. at the heating rate of less than 60° C./minute, the volatile organic substance is gradually volatilized and the volatile substance derived from the volatile organic substance is released into the system and stayed, and thereby the carbon precursor surface is tends to be modified sufficiently.

The volatile organic substance is preferably an organic substance having a residual carbon ratio of lower than 5% by mass, and is preferably an organic substance having a residual carbon ratio of lower than 5% by mass when incinerated at 800° C. The volatile organic substance is preferably a substance that generates a volatile substance (for example, hydrocarbon-based gas or tar) capable of reducing the specific surface area of the carbon precursor. In the volatile organic substance, the content of the volatile substance (for example, hydrocarbon-based gas or tar components) capable of reducing the specific surface area is not particularly limited, but it is preferably 10% by mass or more, from the viewpoint of the stable operation of the equipment used. The upper limit of the content of the volatile component is not particularly limited, but it is preferably 95% by mass or lower, more preferably 80% by mass or lower, and still more preferably 50% by mass or lower, from the viewpoint of suppressing the generation of tar in the equipment. The volatile component is calculated from the ignition residue after the ignition of the sample in an inert gas and the charged amount. As for the ignition, about 1 g of the volatile organic substance (the precise mass thereof is defined as $W_0$ (g)) is placed in a crucible, and the crucible is heated to 800° C. at 10° C./minute in an electric furnace while flowing 20 liters of nitrogen per minute, followed by 1 hour ignition at 800° C. The residue at this time is defined as the ignition residue, and the mass thereof is defined as W (g). The volatile component P (%) is calculated from the following formula.

$$P = \frac{W_0 - W}{W_0} \qquad \text{[Math. 1]}$$

Examples of the volatile organic substance include thermoplastic resins and low-molecular-weight organic compounds. Specific examples of the thermoplastic resins include polystyrene, polyethylene, polypropylene, poly(meth)acrylic acid, poly(meth)acrylic acid esters and the like. In this specification, (meth)acryl is a generic term for methacryl and acryl. Examples of the low-molecular-weight organic compounds include toluene, xylene, mesitylene, styrene, naphthalene, phenanthrene, anthracene, pyrene and the like. As the thermoplastic resin, polystyrene, polyethylene and polypropylene are preferable, since those which volatilize within the range of the raised temperature and which do not oxidize the surface of the carbon precursor when thermally decomposed are preferable. As the low-molecular-weight organic compound, naphthalene, phenanthrene, anthracene, pyrene and the like are preferable, since those which has low volatility at normal temperature is preferable from the viewpoint of safety.

In one embodiment of the present invention, as the thermoplastic resins, an olefin-based resin, styrene-based resin, and (meth)acrylic acid-based resin may be mentioned. Examples of the olefin-based resin include polyethylene, polypropylene, random copolymers of ethylene and propylene, block copolymers of ethylene and propylene, and the like. Examples of the styrene-based resin include polystyrene, poly($\alpha$-methylstyrene), copolymers of styrene and (meth)acrylic acid alkyl ester (the number of carbon atoms in the alkyl group is 1 to 12, preferably 1 to 6), and the like. Examples of the (meth)acrylic acid-based resin include polyacrylic acid, polymethacrylic acid, and (meth)acrylic acid alkyl ester polymer (the number of carbon atoms in the alkyl group is 1 to 12, preferably 1 to 6).

In one embodiment of the present invention, for example, a hydrocarbon compound having 1 to 20 carbon atoms can be used as a low-molecular-weight organic compound. The number of carbon atoms of the hydrocarbon compound is preferably 2 to 18, more preferably 3 to 16. The hydrocarbon compound may be a saturated hydrocarbon compound or an unsaturated hydrocarbon compound, and may be a chain hydrocarbon compound or a cyclic hydrocarbon compound. In the case of the unsaturated hydrocarbon compound, the unsaturated bond may be either a double bond or a triple bond, and the number of unsaturated bond comprised in one molecule is not particularly limited. For example, the chain hydrocarbon compound is an aliphatic hydrocarbon compound and can include straight chain or branched alkanes, alkenes or alkynes. The cyclic hydrocarbon compound can include an alicyclic hydrocarbon compound (for example, cycloalkanes, cycloalkenes, cycloalkynes) or aromatic hydrocarbon compound. Specific examples of the aliphatic hydrocarbon compound include methane, ethane, propane, butane, pentane, hexane, octane, nonane, decane, ethylene, propylene, butene, pentene, hexene, acetylene and the like. Examples of the alicyclic hydrocarbon compound include cyclopentane, cyclohexane, cycloheptane, cyclooctane, cyclononane, cyclopropane, cyclopentene, cyclohexene, cycloheptene, cyclooctene, decalin, norbornene, methylcyclohexane, norbornadiene and the like. Furthermore, the aromatic hydrocarbon compound includes a monocyclic aromatic compound such as benzene, toluene, xylene, mesitylene, cumene, butylbenzene, styrene, $\alpha$-methylstyrene, o-methylstyrene, m-methylstyrene, p-methylstyrene, vinylxylene, p-tert-butylstyren, ethylstyrene and the like, and a 3- to 6-rings condensed polycyclic aromatic compound such as naphthalene, phenanthrene, anthracene, pyrene and the like. The condensed polycyclic aromatic compound is preferable, and naphthalene, phenanthrene, anthracene or pyrene are more preferable. The hydrocarbon compound may have any substituent. The substituent is not particularly limited, but for example, an alkyl group having 1 to 4 carbon atoms (preferably an alkyl group having 1 to 2 carbon atoms), an alkenyl group having 2 to 4 carbon atoms (preferably an alkenyl group having 2 carbon atoms), and a cycloalkyl group having 3 to 8 carbon atoms (preferably a cycloalkyl group having 3 to 6 carbon atoms) can be mentioned.

The volatile organic substance is preferably solid at normal temperature. For example, a thermoplastic resin which is solid at normal temperature such as polystyrene, polyethylene, polypropylene and the like or low-molecular-weight organic compound which is solid at normal temperature such as naphthalene, phenanthrene, anthracene, pyrene, and the like are more preferred. As the thermoplastic resin, an olefin-based resin and styrene-based resin are preferred, and polystyrene, polyethylene and polypropylene are preferable, since those which volatilize, and which do not oxidize the surface of the carbon precursor when thermally decomposed within the range of the raised temperature are preferable. From the viewpoint of safety, the low-molecular-weight organic compound is preferably a hydrocarbon compound having 1 to 20 carbon atoms, more preferably a condensed polycyclic aromatic compound, and still more preferably naphthalene, phenanthrene, anthracene or pyrene. Furthermore, from the viewpoint of residual carbon ratio, a thermoplastic resin is preferred, an olefin resin and styrene resin are more preferred, polystyrene, polyethylene and polypropylene are more preferred, and polystyrene and polyethylene are particularly preferred.

The residual carbon ratio is measured by quantifying the amount of carbon in the ignition residue after the ignition of the sample in an inert gas. Ignition is performed by putting about 1 g of the volatile organic substance (this precise mass thereof is defined as $W_1$ (g)) in a crucible, heating the crucible from normal temperature to 800° C. at a heating rate of 10° C./minute in an electric furnace while flowing 20 liters of nitrogen per minute, and then igniting at 800° C. for 1 hour. The residue at this time is defined as an ignition residue, and the mass thereof is defined as $W_2$ (g).

Then, the ignition residue is subjected to an elemental analysis according to the method specified in JIS M8819 to measure the carbon mass ratio $P_1$ (% by mass). The residual carbon ratio $P_2$ (% by mass) is calculated according to the following formula.

$$P_2 = P_1 \times \frac{W_2}{W_1} \qquad \text{[Math. 2]}$$

In the present invention, the method of heating the carbon precursor and volatile organic substance is not particularly limited. The carbon precursor and volatile organic substance may be mixed in advance before heating, or may be placed separately in the heating system. It is preferable to mix the carbon precursor and volatile organic substance in advance since the surface of the carbon precursor is likely to be uniformly modified.

The mixing of the carbon precursor and volatile organic substance may be performed either before or after the pulverization step.

In the case of mixing the carbon precursor and volatile organic substance before the pulverization step, the pulverization and mixing can be performed at the same time by simultaneously supplying the carbon precursor and volatile organic substance to a pulverizer while weighing them.

When the mixing is performed after the pulverization step, any known mixing method can be employed as long as it is a method by which both components are uniformly mixed. When the volatile organic substance is solid at normal temperature, it is preferable to be mixed in the form of particles, but the shape and particle size are not particularly limited. From the viewpoint of uniformly dispersing the volatile organic substance in the pulverized carbon precursor, the average particle size of the volatile organic substance is preferably 0.1 to 2000 µm, more preferably 1 to 1000 µm, still more preferably 2 to 600 µm.

The mixture may comprise a component other than the carbon precursor and volatile organic substance. For example, the mixture may comprise natural graphite, artificial graphite, a metal-based material, alloy-based material or oxide-based material. The content of the other component is not particularly limited, but it is preferably 50 parts by mass or less, more preferably 30 parts by mass or less, still more preferably 20 parts by mass or less, particularly preferably 10 parts by mass or less, with respect to 100 parts by mass of the mixture of the carbon precursor and volatile organic substance.

The mass ratio of the carbon precursor and volatile organic substance in the heating system is not particularly limited, but the mass ratio of the carbon precursor to volatile organic substance is preferably 97:3 to 40:60, more preferably 95:5 to 60:40, still more preferably 93:7 to 80:20. When the amount of the volatile organic substance is 3 parts by mass or more, the modification is likely to be performed sufficiently. Meanwhile, when the amount of the volatile organic substance is excessive, excessive reaction occurs at the powder surface layer, and thereby lumpy objects are easily formed, which is not preferable.

A heating rate in the heating step from 600 to 900° C. is preferably 60° C./minute or less, more preferably less than 60° C./minute, still more preferably 50° C./minute or less, even more preferably 40° C./minute or less, and particularly preferably 30° C./minute or less, more particularly preferably 20° C./minute or less, extremely preferably 10° C./minute or less. The lower limit of the heating rate is usually 5° C./minute or more. If the heating rate is 60° C./minute or more, the volatilization rate of the volatile organic substance is fast and the volatile substance is difficult to stay, and thereby there is a possibility that the surface of the carbon precursor is not sufficiently modified. The reaction time in the heating step from 600 to 900° C. is preferably 5 minutes or longer, more preferably longer than 5 minutes, still more preferably 6 minutes or longer, even more preferably 7.5 minutes or longer, particularly preferably 10 minutes or longer, more particularly preferably 15 minutes or longer, and extremely preferably 30 minutes or longer, calculated from the heating rate.

The heating rate from the starting temperature (for example, room temperature) to 600° C. is not particularly limited, but from a commercial point of view, it is preferably 5 to 300° C./minute, more preferably 10 to 60° C./minute.

As a heating device, any devices commonly used for producing the carbonaceous material can be used. Examples of such devices include a circulation dryer, oven, rotary kiln and the like. In order to heat the mixture uniformly, the mixture may be heated while being appropriately stirred.

The heating step can be performed in an inert gas atmosphere. Nitrogen, argon and the like can be mentioned as an inert gas. The heating step may be performed under atmospheric pressure or under reduced pressure, and when performed under reduced pressure, it can be performed at, for example, 10 kPa or less.

(Heat Treatment Step)

Another aspect of the present invention is a method comprising a step of performing a heat treatment of a carbon precursor having a BET specific surface area of 500 m²/g or less at a temperature of 600° C. or higher and lower than 900° C. for more than 5 minutes in the presence of a volatile substance derived from a volatile organic substance.

The volatile substance derived from the volatile organic substance is a gaseous substance by volatilizing the volatile organic substance, and a substance generated by thermal decomposition of the volatile organic substance capable of reducing the specific surface area of the carbon precursor. As specific examples of the gaseous substance by volatilizing the volatile organic substance, a hydrocarbon compound having 1 to 20 carbon atoms can be used. The number of the carbon atom of the hydrocarbon compound is preferably 2 to 18, more preferably 3 to 16. The hydrocarbon compound may be a saturated hydrocarbon compound or an unsaturated hydrocarbon compound, and may be a chain hydrocarbon compound or a cyclic hydrocarbon compound. In the case of unsaturated hydrocarbon compound, the unsaturated bond may be a double bond or triple bond, and the number of unsaturated bonds comprised in one molecule is not particularly limited. For example, the chain hydrocarbon compound is an aliphatic hydrocarbon compound and can include straight or branched alkanes, alkenes, or alkynes. The cyclic hydrocarbon compound can include an alicyclic hydrocarbon compound (for example, cycloalkanes, cycloalkenes, cycloalkynes) or an aromatic hydrocarbon compound. Specific examples of the aliphatic hydrocarbon compound include methane, ethane, propane, butane, pentane, hexane, octane, nonane, decane, ethylene, propylene, butene, pentene, hexene, acetylene and the like. Examples of the alicyclic hydrocarbon compound include cyclopentane, cyclohexane, cycloheptane, cyclooctane, cyclononane, cyclopropane, cyclopentene, cyclohexene, cycloheptene, cyclooctene, decalin, norbornene, methylcyclohexane, norbornadiene and the like. The aromatic hydrocarbon compound include a monocyclic aromatic compound such as benzene, toluene, xylene, mesitylene, cumene, butylbenzene, styrene, α-methylstyrene, o-methylstyrene, m-methylstyrene, p-methylstyrene, vinylxylene, p-tert-butylstyrene, ethylstyrene and a 3- to 6-rings condensed polycyclic aromatic compound such as naphthalene, phenanthrene, anthracene, and pyrene. From the viewpoint of reactivity with the carbonaceous material and handeability, the monocyclic aromatic compound such as benzene, toluene, xylene, mesitylene, cumene, butylbenzene, styrene, α-methylstyrene, o-methylstyrene, m-methylstyrene, p-methylstyrene, vinyl xylene, p-tert-butylstyrene, ethylstyrene and the like are more preferred.

The concentration of the volatile substance in the heat treatment system is preferably 1.0% by volume or more, more preferably 1.5% by volume or more, still more preferably 5% by volume or more, and preferably 95% by volume or less, more preferably 85% by volume or less, still more preferably 75% by volume or less. When the concentration of the volatile substance is within the above range, the carbon precursor is sufficiently modified, and the influence on the heat treatment device tends to be reduced.

Examples of a gas other than the volatile substance comprised in the heat treatment system include an inert gas such as nitrogen and argon. The heat treatment step may be performed under atmospheric pressure or under reduced pressure, and when performed under reduced pressure, it can be performed at, for example, 10 kPa or less.

The heat treatment step may be performed by the steps of, for example, placing only the volatile organic substance in a furnace alone and then heating, filling the system with gaseous volatile substance derived from the volatile organic substance, placing the carbon precursor in the system and reacting the carbon precursor with gaseous volatile substance. Alternatively, the gaseous volatile substance may be introduced into the reaction system where the carbon precursor is present. This heat treatment step is characterized in that the gaseous volatile substance reacts with the carbon precursor. By reacting the carbon precursor with the gaseous volatile substance, the carbon precursor is easily sufficiently modified by the volatile substance.

The temperature of the heat treatment step is 600° C. or higher, more preferably 650° C. or higher, and it is performed at lower than 900° C., preferably 850° C. or lower. When the heat treatment temperature is within the above range, structural construction does not proceed excessively, and thereby the development of pores tends to be suppressed.

The heat treatment time is more than 5 minutes, preferably 15 minutes or more, more preferably 30 minutes or more. The temperature may be constant within the above range, or may vary within the above range. When the temperature changes, the rate of change is preferably less than 60° C./minute, more preferably 30° C./minute or less.

As a heating device, any devices commonly used for producing the carbonaceous materials can be used. Examples of such devices include a circulation dryer, oven, rotary kiln and the like. The carbon precursor may be heated while being appropriately stirred so that the modification by the volatile substance occurs uniformly.

(Additional Heat Treatment Step)

The method of producing the carbonaceous material of the present invention may further comprise a step of performing a heat treatment at 900° C. or higher and 1180° C. or lower after the heating step and/or heat treatment step.

The temperature of the additional heat treatment step is preferably 900° C. or higher, more preferably 1000° C. or higher, and preferably 1180° C. or lower, more preferably 1100° C. or lower. When the additional heat treatment temperature is within the above range, it is easy to obtain the carbonaceous material having high discharge capacity. As one embodiment of the present invention, when the heating is performed in the absence of the volatile organic substance and volatile substance, the lower limit of the temperature of the additional heat treatment step is preferably more than 1100° C., more preferably 1140° C. or higher.

The time of the additional heat treatment step is preferably 10 minutes or more, more preferably 20 minutes or more, and preferably 350 minutes or less, more preferably 120 minutes or less, still more preferably 60 minutes or less. When the time of the additional heat treatment step is within the above range, it is easy to obtain the carbonaceous material with high discharge capacity.

As with the heating step and heat treatment step, the additional heat treatment step can be performed in an inert gas atmosphere. Nitrogen, argon and the like can be mentioned as the inert gas. The additional heat treatment step may be performed under atmospheric pressure or under reduced pressure, and when performed under reduced pressure, it can be performed at, for example, 10 kPa or less.

The additional heat treatment step may be performed continuously after the heating step and/or heat treatment step, or may be performed once cooled.

<Electrochemical Device>

The carbonaceous material of the present invention can be suitably used for an electrochemical device.

Examples of the electrochemical device include aqueous electrolyte batteries such as a lead-carbon battery; non-aqueous electrolyte batteries such as a lithium-ion secondary battery, nickel-hydrogen secondary battery, nickel-cadmium secondary battery, sodium ion battery, lithium-sulfur battery, lithium-air battery, all-solid-state battery, and organic radical battery; various batteries such as a fuel cell; and capacitors such as an electric double layer capacitor, hybrid capacitor and lithium ion capacitor. Among them, the electrochemical device may be preferably a non-aqueous electrolyte secondary battery (for example, a lithium ion secondary battery, sodium ion battery, lithium-sulfur battery, lithium-air battery, all-solid-state battery, organic radical battery and the like), particularly preferably a lithium ion secondary battery.

When metal ions are used for pre-doping in the electrochemical device, the metal ions to be pre-doped are preferably alkali metal ions, more preferably a lithium ion, sodium ion and potassium ion, and particularly preferably a lithium ion.

When used for a battery, the carbonaceous material of the present invention can be used, for example, as an electrode, conductive material in an electrode, or active material. When used for a capacitor, the carbonaceous material of the present invention can be used, for example, as an electrode or active material.

Accordingly, the present invention is also directed to an electrochemical device comprising the carbonaceous material of the present invention.

In such an electrochemical device, commonly used components can be used as a component other than the carbonaceous material of the present invention. For example, in a lithium ion secondary battery, a negative electrode comprising the carbonaceous material of the present invention is produced by adding a bonding agent (a binder) to the carbonaceous material of the present invention, adding an appropriate amount of a suitable solvent, kneading them, and making it into an electrode mixture, and then applying the mixture to a current collector made of a metal plate and the like, drying the mixture, and molding under pressure.

By using the carbonaceous material of the present invention, an electrode having high conductivity can be produced without adding a conductive aid. For the purpose of imparting higher conductivity, a conductive aid may be added during the preparation of the electrode mixture, if necessary. As a conductive aid, a conductive carbon black, vaporgrown carbon fiber (VGCF), nanotube and the like can be used. The amount of the conductive aid added varies depending on the type of the conductive aid used, but if the amount added is too small, the expected conductivity may not be obtained. If the amount added is too large, the dispersibility in the electrode mixture will be poor. From such a point of view, the preferred ratio of the conductive aid to be added is 0.5 to 10% by mass (wherein, active material (carbonaceous material) amount+binder amount+conductive aid amount=100% by mass), more preferably 0.5 to 7% by mass, particularly preferably 0.5 to 5% by mass. The bonding agent is not particularly limited as long as it does not react with an electrolytic solution, such as PVDF (polyvinylidene fluoride), polytetrafluoroethylene, and a mixture of SBR (styrene-butadiene rubber) and CMC (carboxymethyl cellulose). Among them, PVDF is preferred since PVDF adhered to the surface of the active material hardly inhibits the movement of lithium ions, and thereby good input/output characteristics can be obtained. A polar solvent such as N-methylpyrrolidone (NMP) is preferably used to dissolve PVDF to form a slurry, but an aqueous emulsion such as SBR or CMC dissolved in water can also be used. If the amount of the bonding agent added is too large, the resistance of the resulting electrode increases, which may increase the internal resistance of the battery and degrade the battery characteristics. If the amount of the bonding agent added is too small, the bonding between the each particle of the negative electrode material or between the negative electrode material and the current collector may be insufficient. The amount of the bonding agent to be added varies depending on the type of the binder used, but it is preferably 3 to 13% by mass, more preferably 3 to 10% by mass for the PVDF-based binder, for example. Meanwhile, the binder that needs water as a solvent is often used by mixing a plurality of binders such as a mixture of SBR and CMC, and the total amount of all binders used is preferably 0.5 to 5% by mass, more preferably 1 to 4% by mass.

An electrode active material layer is basically formed on both sides of the current collector, but may be formed on one side if necessary. The thicker the electrode active material layer, the smaller the amount of the current collector and separator, so that it is preferable for increasing the capacity. However, the wider the electrode area facing the counter electrode, the more advantageous for improving the input/output characteristics. Thus, if the electrode active material layer is too thick, the input/output characteristics may be degraded. The thickness of the active material layer (per one side) is preferably 10 to 500 μm, more preferably 20 to 280 μm, particularly preferably 20 to 80 μm, from the viewpoint of output during the battery discharge.

When a negative electrode for a lithium ion secondary battery is formed by using the carbonaceous material of the present invention, other materials constituting the battery such as a positive electrode material, separator, and electrolyte are not particularly limited. Various materials conventionally used or proposed for the lithium ion secondary battery can be used.

For example, as a positive electrode material, a complex metal chalcogen compounds of layered oxide base (represented as $LiMO_2$, where M is a metal: for example, $LiCoO_2$, $LiNiO_1$, $LiMnO_1$, or $LiNi_xCo_yMo_zO_2$ (where x, y and z represent the composition ratio); olivine base (represented as $LiMPO_4$, where M is a metal: for example $LiFePO_4$), spinel base (represented as $LiM_2O_4$, where M is a metal: for example, $LiMn_2O_4$) are preferred, and these chalcogen compounds may be mixed if necessary. The positive electrode is formed by molding these positive electrode materials together with a suitable binder and a carbon material for imparting electrical conductivity to the electrode, and forming a layer on a conductive current collection material.

A non-aqueous electrolytic solution used in combination with these positive and negative electrodes is generally formed by dissolving an electrolyte in a non-aqueous solvent. Examples of a non-aqueous solvent include organic solvents such as propylene carbonate, ethylene carbonate, dimethyl carbonate, diethyl carbonate, dimethoxyethane, diethoxyethane, γ-butyllactone, tetrahydrofuran, 2-methyltetrahydrofuran, sulfolane, 1,3-dioxolane and the like. These organic solvents can be used alone or in combination of two or more. As an electrolyte, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ or the like are used.

The lithium ion secondary battery is generally formed by facing the positive electrode and negative electrode formed as described above each other, if necessary, via a permeable separator made of non-woven fabric or other porous material, and immersing them in the electrolytic solution. As the separator, a permeable separator made of a non-woven fabric or other porous material commonly used in a secondary battery can be used. Alternatively, instead of, or together with the separator, a solid electrolyte comprising a polymer gel impregnated with an electrolytic solution can be used.

When the above lithium ion secondary battery is used with pre-doping, before the first charge of the battery after combining the positive electrode, negative electrode, separator and electrolyte, a pre-doping step in which metal ions are stored in the negative electrode active material in the negative electrode in advance can be performed.

The method of doping lithium ions in the negative electrode active material is not particularly limited, but for example, the method of mixing and kneading a slurry prepared by dispersing the negative electrode active material and metal lithium in an electrolyte (in this case, lithium ions whose quantity is equivalent to the amount of metal lithium added can be doped into the negative electrode active material), or the method of electrochemically pre-doping by laminating a negative electrode active material layer made by using the negative electrode active material, separator, and lithium metal layer (for example, lithium metal foil) in this order, holding the laminated body by a pair of current collectors (for example, copper foil), externally short-circuiting the negative electrode active material layer and the lithium metal layer of the laminated body using a known charge and discharge device, and charging a negative electrode active material layer, may be mentioned.

EXAMPLES

<Measurement of Adsorption-Desorption Isotherm of Carbon Dioxide>

For each carbonaceous material, using a gas adsorption measurement device (AUTOSORB-iQ MP-XR, manufactured by Quantachrome), adsorption-desorption isotherms were obtained by measuring the adsorption and desorption of carbon dioxide at 273 K at relative pressures ($p/p_0$) from 0.00075 to 0.030.

(Pore Volume)

The adsorption-desorption isotherms obtained above were analyzed by Grand Canonical Monte Carlo method using "$CO_2$ at 273K on carbon" as a calculation model and a pore volume of pores having a diameter of 0.35 to 1.47 nm was determined.

(Adsorption Amount and Desorption Amount of Carbon Dioxide)

From the adsorption-desorption isotherms obtained above, desorption amount/adsorption amount was obtained from the ratio of the desorption amount to the adsorption amount at a relative pressure of 0.01.

<Oxygen Element Content>

Oxygen element content was measured by using "oxygen/nitrogen/hydrogen analyzer EMGA-930" manufactured by HORIBA, Ltd.

The detection method of the analyzer is: oxygen: inert gas fusion-non-dispersive infrared absorption method (NDIR), and calibrated with a Ni capsule, $TiH_2$ (H standard sample), and SS-3 (oxygen standard sample). 20 mg of a sample having the moisture content measured at 250° C. for about 10 minutes for a pretreatment was put into a Ni capsule and measured after 30 seconds of degasification in the elemental analyzer. The test was performed by analyzing three specimens, and an average value was used as an analysis value.

<Mesopore Volume>

Using BELSORP-mini manufactured by Bell Japan Inc., the carbonaceous material obtained in Examples and Comparative Examples was filled in a sample tube and the heat treatment at 300° C. was performed for 5 hours under reduced pressure. Then, nitrogen adsorption isotherm of the carbonaceous material at 77K was measured. The Barrett-Joyner-Halenda (BJH) method was applied to the obtained adsorption isotherm, and the mesopore volume was defined as the range of pore diameters from 2.5 nm to 33 nm.

<Average Particle Size ($D_{50}$)>

The average particle size $D_{50}$ (particle size distribution) of the carbon precursor used in Examples and Comparative Examples and carbonaceous material obtained in Examples and Comparative Examples was measured in accordance with following laser scattering method. The sample of the carbon precursor and carbonaceous material of Examples and Comparative Examples to be described later was put into an aqueous solution comprising 0.3% by mass surfactant ("Toriton X 100" manufactured by Wako Pure Chemical Industries), treated by an ultrasonic cleaner for 10 minutes or more, and dispersed in the aqueous solution. The particle size distribution was measured by using this dispersion. The particle size distribution measurement was performed by using a particle size/particle size distribution measuring device ("Microtrac MT3000" manufactured by Nikkiso Co., Ltd.) with a solvent refractive index of 1.33 and particle permeability as absorption. The particle size at which the cumulative volume reached 50% was defined as the average particle size $D_{50}$.

<BET Specific Surface Area by Nitrogen Adsorption Method>

The specific surface area of the carbonaceous material and carbon precursor is determined by the BET method (3 points BET method by nitrogen adsorption) (BET specific surface area). An approximate equation derived from a BET equation is described below.

$$p/[v(p_0-p)] = (1/v_m c) + [(c-1)/v_m c](p/p_0) \quad \text{[Math. 3]}$$

By using the approximate equation, $v_m$ is obtained by the three-point method by nitrogen adsorption at liquid nitrogen temperature, and the specific surface area of the sample was calculated by the following formula.

$$\text{Specific surface area} = \left(\frac{v_m N a}{22400}\right) \times 10^{-18} \quad \text{[Math. 4]}$$

In the formula, $v_m$ is the adsorption amount ($cm^3/g$) required for forming a monomolecular layer on the sample surface, v is the actually measured adsorption amount ($cm^3/g$), $p_0$ is the saturated vapor pressure, p is the absolute pressure, c is the constant (reflecting the adsorption heat), N is the Avogadro's number $6.022 \times 10^{23}$, and a ($nm^2$) is the area occupied by adsorbate molecules on the sample surface (molecular occupied cross-sectional area).

Specifically, the adsorption amount of nitrogen to the sample at the liquid nitrogen temperature was measured by using "BELL Sorb Mini" manufactured by Bell Japan Inc. as follows. The sample was filled in a sample tube and the sample tube was cooled to −196° C., the pressure was once reduced, and nitrogen (purity: 99.999%) was then adsorbed to the sample at a desired relative pressure. An adsorbed gas amount v was defined as an amount of nitrogen adsorbed to the sample when the equilibrium pressure was reached at each desired relative pressure.

<Interplanar Spacing $d_{002}$ of (002) Plane>

Using "MiniFlex II" manufactured by Rigaku Corporation, the carbonaceous material was loaded to a sample holder, and an X-ray diffraction pattern was obtained using a CuKa ray monochromatized through an Ni filter as a radiation source. A peak position of the diffraction pattern was determined by a centroid method (a method of determining the centroid position of a diffraction line to determine a peak position at a corresponding value of 2θ) and then corrected using a diffraction peak of the (111) plane of high-purity silicon powder for a standard substance. The wavelength λ of the CuKa ray was set at 0.15418 nm, and $d_{002}$ was calculated by the following Bragg equation.

$$d_{002} = \frac{\lambda}{2 \cdot \sin\theta} \text{ (Bragg equation)} \quad \text{[Math. 5]}$$

<Measurement of Residual Carbon Ratio>

The residual carbon ratio was measured by quantifying the amount of carbon in the ignition residue after the ignition of the sample in an inert gas. The ignition was performed by putting about 1 g of the volatile organic substance (this exact mass is defined as $W_1$ (g)) in a crucible, and heating the crucible in an electric furnace from normal temperature to 800° C. at a heating rate of 10° C./minute while flowing 20 liters of nitrogen per minute, and then igniting at 800° C. for 1 hour. The residue at this time was defined as the ignition residue, and the mass thereof was defined as $W_2$ (g).

Then, the ignition residue was subjected to an elemental analysis according to the method specified in JIS M8819, and the carbon mass ratio $P_1$ (% by mass) was measured. The residual carbon ratio $P_2$ (% by mass) was calculated by the following formula.

$$P_2 = P_1 \times \frac{W_2}{W_1} \quad \text{[Math. 6]}$$

<Preparation of Carbon Precursor>

100 g of coconut shell char A (comprising 98% by mass of particles with a particle size of 0.850 to 2.360 mm) obtained by crushing coconut shells and carbonizing at 500° C. was treated at 950° C. for 80 minutes with supplying nitrogen gas comprising 1% by volume of hydrogen chloride gas at a flow rate of 10 L/minute. Then, only the supply of hydrogen chloride gas was stopped, and the further heat treatment was performed at 950° C. for 30 minutes. After that, the char was coarsely pulverized with a fine mill SF5 (manufactured by Nippon Coke Co., Ltd.) to an average particle size of 10 µm, and then pulverized with a compact jet mill ("Cojet System α-mkIII" manufactured by Seishin Enterprise Co., Ltd.). Further, the char was classified using Labo Classile N-01 (manufactured by Seishin Enterprise Co., Ltd.) to obtain a carbon precursor A with a specific surface area of 410 m$^2$/g and an average particle size of 5.1 µm, and carbon precursor B with a specific surface area of 400 m$^2$/g and an average particle size of 9.7 µm, respectively.

The obtained carbon precursor A with an average particle size of 5.1 µm was further pulverized with the fine mill SF5 (manufactured by Nippon Coke Co., Ltd.) to obtain carbon precursors with an average particle size of 1.3 µm, 2.2 µm, 2.6 µm, and 3.1 µm (each of them was defined as carbon precursor C, D, E, and F, respectively).

1. Experimental Example Regarding Carbonaceous Material of Embodiment I

Example 1

0.9 g of polystyrene (manufactured by Sekisui Kasei Co., Ltd., average particle size: 400 µm, residual carbon ratio: 1.2% by mass) was mixed with 9.1 g of carbon precursor B. 10 g of this mixture was placed in a graphite sagger so that the thickness of the sample layer was about 3 mm. The sagger was placed in a high-speed heating furnace manufactured by Motoyama Co., Ltd., and heated under a nitrogen flow rate of 5 L per minute. The heating rate from 600° C. to 900° C. was 5° C. per minute (heating time: 60 minutes), and the heating rate in other temperature ranges was 60° C. per minute. After the temperature was raised to 900° C., the temperature was maintained at 900° C. for 60 minutes and then the sample was naturally cooled. After confirming that the temperature in the furnace had dropped to 200° C. or less, the carbonaceous material was taken out from the furnace.

Example 2

A carbonaceous material was obtained in the same manner as in Example 1 except that the heating rate from 600° C. to 900° C. was 10° C. per minute (heating time: 30 minutes) and after the temperature was raised to 900° C., the temperature was maintained at 900° C. for 20 minutes.

Example 3

A carbonaceous material was obtained in the same manner as in Example 1 except that the heating rate from 600° C. to 900° C. was 20° C. per minute (heating time: 15 minutes), then the temperature was raised to 1000° C. at the heating rate of 60° C. per minute, and the temperature was maintained at 1000° C. for 20 minutes.

Example 4

A carbonaceous material was obtained in the same manner as in Example 1 except that the heating rate from 600° C. to 900° C. was 20° C. per minute (heating time: 15 minutes), then the temperature was raised to 1100° C. at the heating rate of 60° C. per minute, and the temperature was maintained at 1100° C. for 20 minutes.

Example 5

A carbonaceous material was obtained in the same manner as in Example 1 except that the heating rate from 600° C. to 900° C. was 5° C. per minute (heating time: 60 minutes), then the temperature was raised to 1175° C. at the heating rate of 60° C. per minute, and the temperature was maintained at 1175° C. for 20 minutes.

Example 6

6.4 g of carbon precursor B was placed in a graphite sagger so that the thickness of the sample layer was about 3 mm. The sagger was placed in a tubular furnace manufactured by Motoyama Co., Ltd., and heated to 600° C. at the heating rate of 60° C. per minute under a nitrogen flow rate of 5 L per minute. After reaching 600° C., toluene was introduced into the furnace using a syringe pump so that the toluene concentration in the nitrogen gas was 1.5% by volume, and the temperature was raised to 900° C. at the heating rate of 5° C. per minute (heating time: 60 minutes). Then, the temperature was maintained at 900° C. for 60 minutes, and the sample was naturally cooled. After confirming that the temperature in the furnace had dropped to 200° C. or less, the carbonaceous material was taken out from the furnace.

Comparative Example 1

0.6 g of polystyrene (manufactured by Sekisui Kasei Co., Ltd., average particle size: 400 µm, residual carbon ratio: 1.2% by mass) was mixed with 6.4 g of carbon precursor B. 7 g of this mixture was placed in a graphite sagger so that the thickness of the sample layer was about 3 mm. The sagger was placed in a tubular furnace manufactured by Motoyama Co., Ltd. which was preheated to 900° C. under a nitrogen flow rate of 5 L per minute. When the temperature inside the furnace was measured, the temperature inside the furnace dropped when the sample was put in, however the temperature rose from 600° C. to 900° C. in 1 minute. After that, the temperature was maintained at 900° C. for 20 minutes, and the sample was naturally cooled. After confirming that the temperature in the furnace had dropped to 200° C. or less, the carbonaceous material was taken out from the furnace.

Comparative Example 2

9.1 g of carbon precursor B was placed in a graphite sagger so that the thickness of the sample layer was about 3 mm. The sagger was placed in a high-speed heating furnace manufactured by Motoyama Co., Ltd., and heated under a nitrogen flow rate of 5 L per minute. The heating rate from 600° C. to 900° C. was 10° C. per minute (heating time: 30 minutes), and the heating rate in other temperature ranges was 60° C. per minute. After the temperature was raised to 900° C., the temperature was maintained at 900° C. for 20 minutes and then the sample was naturally cooled. After confirming that the temperature in the furnace had dropped to 200° C. or less, the carbonaceous material was taken out from the furnace.

Comparative Example 3

0.9 g of polystyrene (manufactured by Sekisui Kasei Co., Ltd., average particle size: 400 µm, residual carbon ratio: 1.2% by mass) was mixed with 9.1 g of carbon precursor B. 10 g of this mixture was placed in a high-speed heating furnace manufactured by Motoyama Co., Ltd., and heated to 1270° C. at the heating rate of 60° C. per minute under a nitrogen flow rate of 5 L per minute. The temperature was maintained at 1270° C. for 11 minutes and then the sample was naturally cooled. After confirming that the temperature in the furnace had dropped to 200° C. or less, the carbonaceous material was taken out from the furnace.

Comparative Example 4

0.9 g of polystyrene (manufactured by Sekisui Kasei Co., Ltd., average particle size: 400 μm, residual carbon ratio: 1.2% by mass) was mixed with 9.1 g of carbon precursor B. 10 g of this mixture was placed in a high-speed heating furnace manufactured by Motoyama Co., Ltd., and heated to 1290° C. at the heating rate of 60° C. per minute under a nitrogen flow rate of 5 L per minute. The temperature was maintained at 1290° C. for 11 minutes and then the sample was naturally cooled. After confirming that the temperature in the furnace had dropped to 200° C. or less, the carbonaceous material was taken out from the furnace.

The conditions of the heating step and/or heat treatment step and the physical properties of the obtained carbonaceous material were shown in Tables 1 and 2 show, respectively.

TABLE 1

| | volatile organic substance | heating step and/or heat treatment step | | additional heat treatment step | |
|---|---|---|---|---|---|
| | | heating rate (° C./minute) | time (minute) | temperature (° C.) | time (minute) |
| Example 1 | polystyrene | 5 | 60 | 900 | 60 |
| Example 2 | polystyrene | 10 | 30 | 900 | 20 |
| Example 3 | polystyrene | 20 | 15 | 1000 | 20 |
| Example 4 | polystyrene | 20 | 15 | 1100 | 20 |
| Example 5 | polystyrene | 5 | 60 | 1175 | 20 |
| Example 6 | 1.5 vol. % toluene | 5 | 60 | 900 | 60 |
| Comparative example 1 | polystyrene | 300 | 1 | 900 | 20 |
| Comparative example 2 | — | 10 | 30 | 900 | 20 |
| Comparative example 3 | polystyrene | 60 | 5 | 1270 | 11 |
| Comparative example 4 | polystyrene | 60 | 5 | 1290 | 11 |

<Battery Evaluation>
(Preparation of Carbon Electrode)

96.2 parts by mass of the carbonaceous material, 2 parts by mass of conductive carbon black ("Super-P (registered trademark)" manufactured by TIMCAL), 1 part by mass of CMC, predetermined amounts of SBR and water were mixed to obtain a slurry. The obtained slurry was applied to a copper foil, dried and pressed to obtain an electrode with a thickness of 60 to 80 μm. The density of the obtained electrode was 0.95 g/cm³. This electrode was punched into a disk shape with a diameter of 14 mm to obtain a carbon electrode plate.

(Preparation of Negative Electrode Half Cell)

The obtained carbon electrode was punched into a disk shape with a diameter of 14 mm to obtain a working electrode, and metallic lithium was used as a counter electrode. As a solvent, ethylene carbonate, dimethyl carbonate and ethyl methyl carbonate were mixed at a volume ratio of 1:1:1 and used. $LiPF_6$ was dissolved in this solvent to a concentration of 1 mol/L and used as an electrolyte. A polypropylene film was used as a separator. A coin cell was produced in a glove box under an argon atmosphere.

(Measurement of Discharge Capacity and Initial Efficiency)

A charge/discharge test was performed on the negative electrode half-cell having the above configuration using a charge/discharge tester ("TOSCAT" manufactured by Toyo System Co., Ltd.). Lithium doping was performed to 1 mV relative to the lithium potential at a rate of 70 mA/g with respect to the mass of the active material. A constant voltage of 1 mV relative to the lithium potential was further applied for 8 hours, and the doping was terminated thereafter. The capacity at this point was defined as the charge capacity (mAh/g). Subsequently, de-doping was performed to 1.5 V relative to the lithium potential at a rate of 70 mA/g with respect to the mass of the active material, and the discharged capacity at this point was defined as the discharge capacity (mAh/g). The percentage of the value obtained by dividing the discharge capacity (mAh/g) by the charge capacity (mAh/g) was defined as the charge-discharge efficiency (initial efficiency) (%), and was used as an indicator of the utilization efficiency of lithium ions in the battery. The results were shown in Table 3.

(Preparation of Positive Electrode)

As a positive electrode active material, 90 parts by mass of lithium iron phosphate ($LiFePO_4$), 5 parts by mass of PVDF (polyvinylidene fluoride), 5 parts by mass of acety-

TABLE 2

| | pore volume (cm³/g) | $CO_2$ desorption amount (cm³/g) | $CO_2$ adsorption amount (cm³/g) | desorption amount/adsorption amount | oxygen content (% by mass) | BET specific surface area (m²/g) | $d_{002}$ (nm) |
|---|---|---|---|---|---|---|---|
| Example 1 | 0.177 | 46.1 | 38.4 | 1.20 | 1.0 | 4 | 0.39 |
| Example 2 | 0.186 | 49.8 | 42.3 | 1.18 | 1.2 | 5 | 0.39 |
| Example 3 | 0.175 | 47.8 | 32.0 | 1.49 | 1.1 | 5 | 0.39 |
| Example 4 | 0.151 | 46.1 | 19.4 | 2.38 | 1.2 | 4 | 0.39 |
| Example 5 | 0.072 | 24.7 | 5.9 | 4.19 | 0.6 | 4 | 0.39 |
| Example 6 | 0.162 | 44.0 | 33.0 | 1.33 | 1.0 | 3 | 0.39 |
| Comparative example 1 | 0.203 | 54.2 | 52.3 | 1.04 | 1.1 | 16 | 0.39 |
| Comparative example 2 | 0.208 | 55.4 | 53.0 | 1.05 | 1.3 | 447 | 0.39 |
| Comparative example 3 | 0.039 | 6.5 | 2.0 | 3.25 | 0.1 | 5 | 0.39 |
| Comparative example 4 | 0.030 | 5.0 | 1.5 | 3.33 | 0.1 | 6 | 0.39 | lene black and NMP (N-methylpyrrolidone) were mixed to obtain a slurry. The obtained slurry was applied to an aluminum foil, dried and then pressed to obtain an electrode with a thickness of 80 to 140 μm. The density of the obtained electrode was 1.8 g/cm$^3$. This electrode was punched into a disk shape with a diameter of 14 mm to obtain a positive electrode plate.

(Preparation of Positive Electrode Half Cell)

Metallic lithium was used as a counter electrode and a reference electrode for the obtained positive electrode. As a solvent, ethylene carbonate and methyl ethyl carbonate were mixed at a volume ratio of 3:7 and used. LiPF$_6$ was dissolved in this solvent to a concentration of 1 mol/L and used as an electrolyte. A glass fiber nonwoven fabric was used for a separator. A coin cell was produced in a glove box under an argon atmosphere.

A charge/discharge test was performed on the positive electrode half-cell having the above configuration using a charge/discharge tester ("TOSCAT" manufactured by Toyo System Co., Ltd.). Lithium de-doping from the positive electrode was performed to 4.0 V relative to the lithium potential at a rate of 15 mA/g with respect to the mass of the active material. The capacity at this time was defined as the charge capacity. Next, lithium doping to the positive electrode was performed to 2.0 V relative to the lithium potential at a rate of 15 mA/g with respect to the mass of the active material. The capacity at this time was defined as the discharge capacity. The resulting charge capacity was 153 mAh/g, the discharge capacity was 141 mAh/g, and the charge-discharge efficiency (initial charge-discharge efficiency) calculated as a percentage of discharge capacity/charge capacity was 92%.

(Preparation of Coin Cell (Full Cell))

The obtained carbon electrode was punched into a disk shape with a diameter of 15 mm and used as a negative electrode. The electrode mixture coated surfaces of the negative electrode and positive electrode were opposed to each other via a separator made of glass fiber nonwoven fabric interposed therebetween so that the positive electrode (14 mm in diameter) did not protrude from the negative electrode plane. At this time, the ratio of the negative electrode charge capacity (mAh) to the positive electrode charge capacity (mAh) per facing area (negative electrode capacity/positive electrode capacity) was adjusted to 1.05. As a solvent, ethylene carbonate and methyl ethyl carbonate were mixed and used at a volume ratio of 3:7. LiPF$_6$ was dissolved in this solvent to a concentration of 1 mol/L and used as an electrolyte. A coin cell was produced in a glove box under an argon atmosphere.

(Charge and Discharge Test (Cycle Durability Test))

A charge/discharge test was performed on the coin cell (full cell) having the above configuration using a charge/discharge tester ("TOSCAT" manufactured by Toyo System Co., Ltd.). The charge was performed to 4.0 V relative to the lithium potential at a rate of 70 mA/g with respect to the mass of the negative electrode active material. The discharge was then performed to 2.0 V relative to the lithium potential at a rate of 70 mA/g with respect to the mass of the negative electrode active material. This cycle was repeated 3 times.

After that, the charge was performed to 4.0 V relative to the lithium potential at a rate of 500 mA/g with respect to the mass of the negative electrode active material, and the capacity at this time was defined as the charge capacity. Then, the discharge was performed to 2.0 V relative to the lithium potential at a rate of 500 mA/g with respect to the mass of the negative electrode active material, and the capacity at this time was defined as the discharge capacity. This cycle was repeated 500 times. The percentage obtained by dividing the discharge capacity at the 500th cycle by the discharge capacity at the 1st cycle was defined as a 500 cycles retention rate. The results are shown in Table 3.

TABLE 3

| | initial efficiency (%) | discharge capacity (mAh/g) | 500 cycles retention rate (%) |
|---|---|---|---|
| Example 1 | 79 | 535 | 80 |
| Example 2 | 79 | 532 | 77 |
| Example 3 | 79 | 525 | 81 |
| Example 4 | 81 | 484 | 89 |
| Example 5 | 85 | 443 | 90 |
| Example 6 | 80 | 533 | 82 |
| Comparative example 1 | 70 | 498 | 59 |
| Comparative example 2 | 64 | 387 | 43 |
| Comparative example 3 | 90 | 387 | 84 |
| Comparative example 4 | 89 | 416 | 85 |

It can be understood that the lithium ion secondary battery comprising the negative electrode comprising the carbonaceous material obtained in Examples 1 to 6 has high initial efficiency and high discharge capacity. In addition, it can be understood that the discharge capacity retention rate after 500 cycles is also high. Meanwhile, at least one of the discharge capacity and 500 cycles retention rate of the lithium ion secondary battery comprising the negative electrode comprising the carbonaceous material obtained in Comparative Examples 1 to 4 was insufficient.

2. Experimental Example Regarding Carbonaceous Material of Embodiment II

Example 7

0.9 g of polystyrene (manufactured by Sekisui Kasei Co., Ltd., average particle size: 400 μm, residual carbon ratio: 1.2% by mass) was mixed with 9.1 g of carbon precursor B with an average particle size of 9.7 μm. 10 g of this mixture was placed in a graphite sagger so that the thickness of the sample layer was about 3 mm. The sagger was placed in a high-speed heating furnace manufactured by Motoyama Co., Ltd., and heated under a nitrogen flow rate of 5 L per minute. The heating rate from 600° C. to 900° C. was 5° C. per minute (heating time: 60 minutes), and the heating rate in other temperature ranges was 60° C. per minute. After the temperature was raised to 900° C., the temperature was maintained at 900° C. for 20 minutes and then the sample was naturally cooled. After confirming that the temperature in the furnace had dropped to 200° C. or less, the carbonaceous material was taken out from the furnace and the carbonaceous material with an average particle size of 9.6 μm was obtained.

The carbon precursor D with an average particle size of 2.2 μm was treated in the same manner as the carbon precursor B with an average particle size of 9.7 μm to obtain a carbonaceous material with an average particle size of 2.1 μm.

Next, the carbonaceous material with an average particle size of 2.1 μm and carbonaceous material with an average particle size of 9.7 μm were mixed at a mass ratio of 1:1 to obtain a carbonaceous material with an average particle size of 4.5 μm.

Example 8

A carbonaceous material was obtained in the same manner as in Example 7 except that the heating rate from 600°

C. to 900° C. was 20° C. per minute (heating time: 15 minutes) and after the temperature was raised to 1000° C., the temperature was maintained at 1000° C. for 20 minutes.

Example 9

0.9 g of polystyrene (manufactured by Sekisui Kasei Co., Ltd., average particle size: 400 μm, residual carbon ratio: 1.2% by mass) was mixed with 9.1 g of the carbon precursor D with an average particle size of 2.2 μm. 10 g of this mixture was placed in a graphite sagger so that the thickness of the sample layer was about 3 mm. The sagger was placed in a high-speed heating furnace manufactured by Motoyama Co., Ltd., and heated under a nitrogen flow rate of 5 L per minute. The heating rate from 600° C. to 900° C. was 20° C. per minute (heating time: 15 minutes), and the heating rate in other temperature ranges was 60° C. per minute. After the temperature was raised to 1100° C., the temperature was maintained at 1100° C. for 20 minutes and then the sample was naturally cooled. After confirming that the temperature in the furnace had dropped to 200° C. or less, the carbonaceous material was taken out from the furnace and the carbonaceous material with an average particle size of 2.1 μm was obtained.

Example 10

A carbonaceous material with an average particle size of 2.5 μm was obtained in the same manner as in Example 9 except that the carbon precursor E with an average particle size of 2.6 μm was used.

Example 11

A carbonaceous material with an average particle size of 3.0 μm was obtained in the same manner as in Example 9 except that the carbon precursor F with an average particle size of 3.1 μm was used.

Example 12

The carbonaceous material with an average particle size of 3.0 μm obtained in Example 11 and the carbonaceous material with an average particle size of 9.6 μm obtained by treating the carbon precursor B with an average particle size of 9.7 μm in the same manner as in Example 9 were mixed at a mass ratio of 1:1. The average particle size of the obtained carbonaceous material was 4.8 μm.

Example 13

The carbonaceous material with an average particle size of 2.1 μm obtained in Example 9 and the carbonaceous material with an average particle size of 9.6 μm obtained by treating the carbon precursor B with an average particle size of 9.7 μm in the same manner as in Example 9 were mixed at a mass ratio of 1:1. The average particle size of the obtained carbonaceous material was 4.5 μm.

Example 14

A carbonaceous material was obtained in the same manner as in Example 7 except that the heating rate from 600° C. to 900° C. was 20° C. per minute (heating time: 15 minutes), and after the temperature was raised to 1175° C., the temperature was maintained at 1175° C. for 20 minutes.

Example 15

9.1 g of carbon precursor A with an average particle size of 5.1 μm was placed in a graphite sagger so that the thickness of the sample layer was about 3 mm. The sagger was placed in a high-speed heating furnace manufactured by Motoyama Co., Ltd., and heated under a nitrogen flow rate of 5 L per minute. The heating rate from 600° C. to 900° C. was 60° C. per minute (heating time: 5 minutes), and the heating rate in other temperature ranges was also 60° C. per minute. After the temperature was raised to 1150° C., the temperature was maintained at 1150° C. for 20 minutes and then the sample was naturally cooled. After confirming that the temperature in the furnace had dropped to 200° C. or less, the carbonaceous material was taken out from the furnace and the carbonaceous material with an average particle size of 5.0 μm was obtained.

Comparative Example 5

A carbonaceous material was obtained in the same manner as in Example 7 except that the heating rate from 600° C. to 900° C. was 300° C. per minute (heating time: 1 minute).

Comparative Example 6

A carbonaceous material was obtained in the same manner as in Example 7 except that the heating rate from 600° C. to 900° C. was 60° C. per minute (heating time: 5 minutes) and after the temperature was raised to 1270° C., the temperature was maintained at 1270° C. for 20 minutes.

Comparative Example 7

A carbonaceous material was obtained in the same manner as in Example 15 except that the heating rate from 600° C. to 900° C. was 60° C. per minute (heating time: 5 minutes) and after the temperature was raised to 1100° C., the temperature was maintained at 1100° C. for 20 minutes.

Comparative Example 8

A carbonaceous material was obtained in the same manner as in Example 15 except that the heating rate from 600° C. to 900° C. was 60° C. per minute (heating time: 5 minutes) and after the temperature was raised to 1050° C., the temperature was maintained at 1050° C. for 360 minutes.

Regarding the carbonaceous material obtained in Examples and Comparative Examples, the pore volume, mesopore volume, adsorption and desorption amount of carbon dioxide, and ratio of adsorption amount to desorption amount (adsorption amount/desorption amount), average particle size ($D_{50}$), specific surface area and interplanar spacing $d_{002}$ are shown in Table 4.

TABLE 4

|  | pore volume (cm³/g) | mesopore volume (mm³/g) | $CO_2$ desorption (cm³/g) | $CO_2$ adsorption (cm³/g) | desorption/ adsorption | $D_{50}$ (μm) | BET specific surface area (m²/g) | $d_{002}$ (nm) |
| --- | --- | --- | --- | --- | --- | --- | --- | --- |
| Example 7 | 0.192 | 14.5 | 50.2 | 43.5 | 1.15 | 4.5 | 22 | 0.39 |
| Example 8 | 0.178 | 10.8 | 48.8 | 35.6 | 1.37 | 4.5 | 22 | 0.39 |
| Example 9 | 0.163 | 22.5 | 48.2 | 21.0 | 2.30 | 2.1 | 40 | 0.39 |
| Example 10 | 0.160 | 14.1 | 47.6 | 20.5 | 2.32 | 2.5 | 22 | 0.39 |
| Example 11 | 0.156 | 10.9 | 46.3 | 20.1 | 2.30 | 3.0 | 12 | 0.39 |
| Example 12 | 0.153 | 7.7 | 46.3 | 19.7 | 2.35 | 4.8 | 8 | 0.39 |
| Example 13 | 0.157 | 13.1 | 47.2 | 19.8 | 2.38 | 4.5 | 15 | 0.39 |
| Example 14 | 0.072 | 10.3 | 24.9 | 6.2 | 4.02 | 4.5 | 21 | 0.39 |
| Example 15 | 0.133 | 3.9 | 32.6 | 30.7 | 1.06 | 5.0 | 29 | 0.39 |
| Comparative example 5 | 0.204 | 20.0 | 55.0 | 53.0 | 1.04 | 4.5 | 26 | 0.39 |
| Comparative example 6 | 0.040 | 10.2 | 6.7 | 3.1 | 2.16 | 4.5 | 20 | 0.39 |
| Comparative example 7 | 0.189 | 13.2 | 45.2 | 44.8 | 1.01 | 5.0 | 58 | 0.39 |
| Comparative example 8 | 0.194 | 14.5 | 47.0 | 45.0 | 1.04 | 5.0 | 47 | 0.39 |

Using the carbonaceous material of Examples 7 to 15 and Comparative Examples 5 to 8, battery evaluation (discharge capacity, initial efficiency, and cycle durability) was performed in the same manner as in the experimental example regarding the carbonaceous material of Embodiment I. In addition to the battery evaluation, input characteristics were measured by the following method. The results are shown in Table 5.

(Measurement of Input Characteristics)

After measuring the discharge capacity and initial efficiency, the negative electrode half-cell was subjected to a charge/discharge test using a charge/discharge tester ("TOSCAT" manufactured by Toyo System Co., Ltd.) to evaluate the input characteristics. Doping was performed in a constant temperature bath at 25° C. to 0 mV relative to the lithium potential at a rate of 500 mA/g with respect to the mass of the negative electrode active material. Next, de-doping was performed to 1.5 V relative to the lithium potential at a rate of 100 mA/g with respect to the mass of the active material, and the discharge capacity at this time was defined as the discharged capacity at 25° C. 1 C (mAh/g).

Next, doping was performed in a constant temperature bath at −20° C. to 0 mV relative to the lithium potential at a rate of 100 mA/g with respect to the mass of the negative electrode active material. Next, de-doping was performed to 1.5 V relative to the lithium potential at a rate of 100 mA/g with respect to the mass of the active material, and the discharged capacity at this time was defined as the discharged capacity at −20° C. 0.2 C (mAh/g).

Subsequently, doping was performed in a constant temperature bath at −20° C. to 0 mV relative to the lithium potential at a rate of 500 mA/g with respect to the mass of the negative electrode active material. Next, de-doping was performed to 1.5 V relative to the lithium potential at a rate of 100 mA/g with respect to the mass of the active material, and the discharged capacity at this time was defined as the discharged capacity at −20° C. 10 (mAh/g).

−20° C. 10/25° C. 1 C and −20° C. 1 C/−20° C. 0.2 C were used as indices of input characteristics and of pre-doping. The value of −20° C. 10/25° C. 1 C measured according to this example is preferably 30% or more, more preferably 40% or more, and still more preferably 45% or more. The value of −20° C. 1 C/−20° C. 0.2 C is preferably 50% or more, more preferably 70% or more, and still more preferably 75% or more.

TABLE 5

|  | discharge capacity (mAh/g) | initial efficiency (%) | 500 cycles retention rate (%) | discharge capacity at 25° C. 1 C (mAh/g) | discharge capacity at −20° C. 0.2 C (mAh/g) | discharge capacity at −20° C. 1 C (mAh/g) | −20° C. 1 C/ 25° C. 1 C (%) | −20° C. 1 C/ −20° C. 0.2 C (%) |
| --- | --- | --- | --- | --- | --- | --- | --- | --- |
| Example 7 | 525 | 75 | 77 | 217 | 110 | 82 | 38 | 75 |
| Example 8 | 478 | 80 | 78 | 214 | 108 | 83 | 39 | 77 |
| Example 9 | 468 | 77 | 74 | 194 | 112 | 87 | 45 | 78 |
| Example 10 | 477 | 78 | 77 | 211 | 121 | 95 | 45 | 79 |
| Example 11 | 481 | 79 | 82 | 163 | 110 | 84 | 52 | 76 |
| Example 12 | 488 | 81 | 86 | 158 | 92 | 67 | 42 | 73 |
| Example 13 | 472 | 78 | 83 | 201 | 104 | 80 | 40 | 77 |
| Example 14 | 433 | 82 | 88 | 160 | 98 | 73 | 46 | 74 |
| Example 15 | 488 | 82 | 72 | 155 | 86 | 64 | 41 | 74 |
| Comparative example 5 | 489 | 68 | 42 | 189 | 102 | 72 | 38 | 71 |
| Comparative example 6 | 377 | 88 | 82 | 154 | 92 | 63 | 41 | 68 |
| Comparative example 7 | 498 | 73 | 57 | 163 | 105 | 74 | 45 | 70 |
| Comparative example 8 | 507 | 70 | 58 | 172 | 105 | 73 | 42 | 70 |

It can be understood that non-aqueous electrolyte secondary batteries comprising the negative electrode comprising the carbonaceous materials obtained in Examples 7 to 15 can be pre-doped at high speed, and simultaneously satisfy high capacity, high initial efficiency and high cycle durability. Meanwhile, the carbonaceous materials obtained in Comparative Examples 5, 7 and 8 have low initial efficiency and cycle retention rate, and the carbonaceous material obtained in Comparative Example 6 has low discharge capacity.

INDUSTRIAL APPLICABILITY

The carbonaceous material of the present invention can be used in the production of electrochemical devices, and such electrochemical devices can have the properties of high capacity and high cycle durability.

The invention claimed is:

1. A carbonaceous material, which has
a pore volume determined by performing Grand Canonical Monte Carlo simulation on an adsorption-desorption isotherm of carbon dioxide at 273 K of 0.05 $cm^3/g$ or more and 0.20 $cm^3/g$ or less, and
a ratio of desorption amount to adsorption amount at a relative pressure of 0.01 in the adsorption-desorption isotherm of 1.05 or more.

2. The carbonaceous material according to claim 1, having an oxygen element content of 0.5% by mass or more.

3. The carbonaceous material according to claim 1, having a BET specific surface area measured in accordance with a nitrogen adsorption method of 1 $m^2/g$ or more and 20 $m^2/g$ or less.

4. The carbonaceous material according to claim 1, having a mesopore volume measured in accordance with a BJH method of 3.7 $mm^3/g$ or more and 41 $mm^3/g$ or less.

5. The carbonaceous material according to claim 4, having an average particle size (D50) of 1.3 μm or more and 9.5 μm or less.

6. The carbonaceous material according to claim 4, having a BET specific surface area measured in accordance with a nitrogen adsorption method of 3 $m^2/g$ or more and 60 $m^2/g$ or less.

7. The carbonaceous material according to claim 1, having an average interplanar spacing $d_{002}$ of the (002) plane calculated in accordance with a Bragg equation by means of a wide-angle X-ray diffraction method of 0.36 nm or more and 0.42 nm or less.

8. The carbonaceous material according to claim 1, for an electrochemical device.

9. The carbonaceous material according to claim 8, which is used with a pre-doping of a metal ion.

10. An electrochemical device, comprising the carbonaceous material according to claim 1.

11. A method of producing the carbonaceous material according to claim 1, the method comprising
heating a carbon precursor having a BET specific surface area measured in accordance with a nitrogen adsorption method of 500 $m^2/g$ or less to 900° C. at a heating rate of 60° C./minute or less in a temperature range of from 600° C. to 900° C., thereby obtaining a heat treated carbon precursor.

12. The method according to claim 11, wherein the heating is performed in the presence of a volatile organic substance.

13. The method according to claim 11, further comprising subsequently performing a second heat treatment at 900° C. or higher and 1180° C. or lower.

14. The method according to claim 11, further comprising pulverizing the carbon precursor and/or the heat treated carbon precursor.

15. The method according to claim 13, further comprising subsequently performing a second heat treatment at 900° C. or higher and 1180° C. or lower.

16. A method of producing the carbonaceous material according to claim 1, the method comprising
performing a heat treatment of a carbon precursor having a BET specific surface area measured in accordance with a nitrogen adsorption method of 500 $m^2/g$ or less at a temperature of 600° C. or higher and lower than 900° C. for more than 5 minutes in the presence of a volatile substance derived from a volatile organic substance, thereby obtaining a heat treated carbon precursor.

17. The method according to claim 16, further comprising pulverizing the carbon precursor and/or the heat treated carbon precursor.

* * * * *